(12) United States Patent
Iezzi

(10) Patent No.: US 11,888,506 B2
(45) Date of Patent: Jan. 30, 2024

(54) SYSTEM AND METHOD OF NOISE REDUCTION

(71) Applicant: Aeronix, Inc., Melbourne, FL (US)

(72) Inventor: Steven L. Iezzi, Melbourne, FL (US)

(73) Assignee: Aeronix, Inc., Melbourne, FL (US)

( * ) Notice: Subject to any disclaimer, the term of this patent is extended or adjusted under 35 U.S.C. 154(b) by 0 days.

(21) Appl. No.: 17/813,459

(22) Filed: Jul. 19, 2022

(65) Prior Publication Data

US 2023/0123105 A1    Apr. 20, 2023

Related U.S. Application Data

(60) Provisional application No. 63/262,697, filed on Oct. 19, 2021.

(51) Int. Cl.
*H04B 1/10* (2006.01)

(52) U.S. Cl.
CPC ......... *H04B 1/1081* (2013.01); *H04B 1/1027* (2013.01)

(58) Field of Classification Search
CPC ........................... H04B 1/1081; H04B 1/1027
See application file for complete search history.

(56) References Cited

U.S. PATENT DOCUMENTS

| | | | |
|---|---|---|---|
| 10,411,744 B1* | 9/2019 | Wilson | H04B 1/1027 |
| 2013/0083876 A1* | 4/2013 | Suzuki | H04B 1/1027 375/350 |
| 2019/0198036 A1* | 6/2019 | Osako | G10L 21/028 |

* cited by examiner

*Primary Examiner* — Janice N Tieu
(74) *Attorney, Agent, or Firm* — Kelly G. Swartz; Widerman Malek, PL

(57) ABSTRACT

A system for signal detection including a receiver, a transforming block, a noise reduction block, and an object detection block. The receiver is adapted to provide an initial dataset sampled in a time domain over a frequency range. The transforming block is adapted to receive the initial dataset and convert the initial dataset from the time domain to a multi-channel time-frequency domain array. The noise reduction block is adapted to receive the multi-channel time-frequency domain array and provide a clean data set, wherein the clean data set is defined as a noise signal subtracted from the multi-channel time-frequency domain array. The object detection block is adapted to receive the clean dataset and to provide a bounded data set, wherein the bounded data set is defined by a bounding box associated with a portion of the multi-channel time-frequency domain array containing a signal with energy above a threshold level.

14 Claims, 27 Drawing Sheets

| Parameter | Symbol | Min | Typ | Max | Unit | Test Conditions/Comments |
|---|---|---|---|---|---|---|
| Frequency Range | | 0.01 | | 3 | GHz | |
| Gain | | | 17.5 | 19.5 | dB | |
| Gain Variation Over Temperature | | | 0.01 | | dB/°C | |
| Noise Figure | | | 1.1 | 1.6 | dB | 0.3 GHz to 3GHz |
| Return Loss | | | | | | |
| Input | | | 15 | | dB | |
| Output | | | 24 | | dB | |
| Output | | | | | | |
| Output Power for 1dB Compression | P1dB | 19.0 | 21.0 | | dBm | |
| Saturated Output Power | $P_{SAT}$ | | 22.5 | | dBm | |
| Output Third-Order Intercept | Ip3 | | 33 | | dBm | |
| Supply Current | $I_{DQ}$ | | 65 | 80 | mA | Adjust $V_{GGT}$ to Achieve $I_{DQ}$=65 mA Typical |
| Supply Voltage | $V_{DD}$ | 2 | 5 | 6 | V | |

FIG. 3

| Parameter | Symbol | Min | Typ | Max | Unit | Test Conditions/Comments |
|---|---|---|---|---|---|---|
| Frequency Range | | 1 | | 6 | GHz | |
| Gain | | | 15 | | dB | |
| Gain Variation Over Temperature | | | 0.01 | | dB/°C | |
| Noise Figure | | | 1.7 | | dB | |
| Return Loss | | | | | | |
| Input | | | 25 | | dB | |
| Output | | | 18 | | dB | |
| Output | | | | | | |
| Output Power for 1dB Compression | P1dB | 12 | | | dBm | |
| Saturated Output Power | $P_{SAT}$ | 17 | 20 | | dBm | |
| Output Third-Order Intercept | OIP3 | | 21 | | dBm | Measurement Taken at $P_{OUT}$ per Tone= 6dBm |
| Output Second-Order Intercept | OIP2 | | 34 | | dBm | Measurement Taken at $P_{OUT}$ per Tone= 6dBm |
| | | | 39 | | dBm | |
| Power Added Efficiency | PAE | | 34 | | % | Measured at $P_{SAT}$ |
| Supply Current | $I_{DQ}$ | | 55 | | mA | |
| Supply Voltage | $V_{DD}$ | 2 | 5 | 6 | V | |

FIG. 4

| Frequency (MHz) | Total Loss¹ (dB) S-1 | Total Loss¹ (dB) S-2 | Amplitude Unbalance (dB) | Isolation (dB) | Phase Unbalance (deg.) | VSWR S | VSWR 1 | VSWR 2 |
|---|---|---|---|---|---|---|---|---|
| 5.00 | 3.53 | 3.53 | 0.00 | 20.75 | 0.02 | 20.00 | 1.89 | 1.90 |
| 10.00 | 3.54 | 3.53 | 0.00 | 26.70 | 0.03 | 1.99 | 1.95 | 1.95 |
| 50.00 | 3.55 | 3.55 | 0.00 | 34.42 | 0.00 | 1.98 | 1.92 | 1.93 |
| 100.00 | 3.58 | 3.57 | 0.00 | 32.37 | 0.00 | 1.97 | 1.90 | 1.91 |
| 300.00 | 3.62 | 3.64 | 0.02 | 32.74 | 0.15 | 1.94 | 1.91 | 1.91 |
| 500.00 | 3.63 | 3.67 | 0.04 | 36.71 | 0.20 | 1.91 | 1.93 | 1.92 |
| 800.00 | 3.63 | 3.71 | 0.08 | 41.65 | 0.21 | 1.88 | 1.95 | 1.94 |
| 1000.00 | 3.62 | 3.74 | 0.12 | 32.30 | 0.22 | 1.85 | 1.97 | 1.97 |
| 1300.00 | 3.60 | 3.78 | 0.18 | 25.10 | 0.46 | 1.78 | 1.99 | 2.04 |
| 1500.00 | 3.57 | 3.80 | 0.23 | 21.96 | 0.45 | 1.70 | 2.01 | 2.09 |
| 1600.00 | 3.55 | 3.81 | 0.26 | 20.61 | 0.54 | 1.65 | 2.01 | 2.10 |
| 1800.00 | 3.53 | 3.81 | 0.28 | 18.38 | 0.52 | 1.54 | 2.01 | 2.13 |
| 2000.00 | 3.53 | 3.82 | 0.30 | 16.50 | 0.66 | 1.41 | 2.02 | 2.16 |
| 2500.00 | 3.64 | 3.87 | 0.23 | 12.68 | 1.47 | 1.09 | 2.00 | 2.13 |
| 2700.00 | 3.75 | 3.90 | 0.15 | 11.51 | 2.40 | 1.13 | 2.00 | 2.10 |

1. Total Loss = Insertion Loss + 3dB Splitter Loss.

FIG. 7

| Frequency (MHz) | Total Loss¹ (dB) S-1 | Total Loss¹ (dB) S-2 | Amplitude Unbalance (dB) | Isolation (dB) | Phase Unbalance (deg.) | VSWR S | VSWR 1 | VSWR 2 |
|---|---|---|---|---|---|---|---|---|
| 100 | 3.93 | 3.94 | 0.00 | 5.13 | 0.00 | 1.75 | 1.52 | 1.52 |
| 500 | 3.92 | 3.92 | 0.00 | 9.39 | 0.01 | 1.61 | 1.30 | 1.29 |
| 1000 | 3.85 | 3.85 | 0.00 | 15.23 | 0.04 | 1.46 | 1.22 | 1.23 |
| 1500 | 3.86 | 3.87 | 0.01 | 20.43 | 0.02 | 1.45 | 1.19 | 1.22 |
| 2000 | 3.85 | 3.86 | 0.00 | 25.99 | 0.10 | 1.26 | 1.09 | 1.12 |
| 3000 | 4.22 | 4.21 | 0.01 | 19.83 | 0.10 | 1.51 | 1.29 | 1.31 |
| 4000 | 4.21 | 4.18 | 0.03 | 28.88 | 0.25 | 1.10 | 1.13 | 1.09 |
| 5000 | 4.48 | 4.39 | 0.09 | 25.69 | 0.23 | 1.13 | 1.34 | 1.22 |
| 6000 | 4.70 | 4.58 | 0.11 | 20.88 | 0.04 | 1.14 | 1.29 | 1.19 |
| 7000 | 5.02 | 4.89 | 0.13 | 22.33 | 0.32 | 1.37 | 1.36 | 1.25 |
| 8000 | 5.20 | 5.06 | 0.14 | 22.91 | 0.30 | 1.12 | 1.29 | 1.25 |
| 8500 | 5.39 | 5.20 | 0.19 | 19.44 | 0.28 | 1.12 | 1.24 | 1.16 |
| 9000 | 5.63 | 5.42 | 0.22 | 16.07 | 0.26 | 1.26 | 1.05 | 1.11 |
| 9500 | 6.19 | 5.81 | 0.38 | 9.92 | 0.47 | 1.70 | 1.45 | 1.52 |
| 10000 | 6.64 | 6.47 | 0.17 | 9.18 | 3.26 | 2.15 | 1.30 | 1.34 |

1. Total Loss = Insertion Loss + 3dB Splitter Loss.

FIG. 8

| Parameter | Frequency (MHz) | Min. | Min. | Max. | Unit. |
|---|---|---|---|---|---|
| Impedance Ratio (Secondary/Primary) | | | 2 | | Ohm |
| Frequency Range | | 10 | | 3000 | GHz |
| Insertion Loss" | 10 - 3000 | — | 1.5 | 3.0 | dB |
| Amplitude Unbalance | 10 - 3000 | — | 0.7 | — | dB |
| Phase Unbalance | 10 - 3000 | — | 4 | — | Degree |

FIG. 13

| Parameter | Room (25°) | | | | | | Unit |
|---|---|---|---|---|---|---|---|
| | Min. | Typ. | Max | Min. | Typ. | Max | |
| Frequency | 2.0 | | 2.5 | 1.6 | | 3.1 | GHz |
| Unbalanced Port Imp. | | 50 | | | 50 | | Ω |
| Balanced Port Imp.** | | 100 | | | 100 | | Ω |
| Return Loss | 14 | 17 | | 10 | 13 | | dB |
| Insertion Loss*** | | 0.6 | 0.8 | | 0.7 | 1.0 | dB |
| Amplitude Balance | | 0.15 | 0.6 | | 0.7 | 1.0 | dB |
| Phase Balance | | 2.3 | 4.8 | | 2.3 | 4.8 | Degrees |
| Power Handling @85°C | | | 0.8 | | | 0.8 | Watts |
| Power Handling @105°C | | | 0.5 | | | 0.5 | Watts |
| Operating Temperature | -55 | | +140 | -55 | | +140 | °C |

FIG. 14

| Parameter | Room (25°) | | | Unit |
|---|---|---|---|---|
| | Min. | Typ. | Max | |
| Frequency | 3100 | | 5000 | MHz |
| Unbalanced Port Impedance | | 50 | | Ω |
| Balanced Port Impedance | | 100 | | Ω |
| Return Loss | 9.5 | 12 | | dB |
| Insertion Loss*** | | 0.8 | 1.1 | dB |
| Amplitude Balance | | 0.5 | 0.9 | dB |
| Phase Balance | | 4.0 | 9.0 | Degrees |
| | | 2.8 | | |
| CMRR | | | | dB |
| Power Handling | | | 2 | Watts |
| Operating Temperature | -55 | | +85 | °C |

FIG. 20

| | Fs (MHz) | Fs/2 (MHz) | Decimation Bandwidth (80%) | Baseband (MHz) | 1st Alias (MHz) | | 2nd Alias (MHz) | | 3rd Alias (MHz) | | 4th Alias (MHz) | | Decimation | Output Clock (MHz) |
|---|---|---|---|---|---|---|---|---|---|---|---|---|---|---|
| Clock 1 | 1250 | 625.000 | 500.000 | 500.000 | 750.000 | 1250.000 | 1250.000 | 1750.000 | 2000.000 | 2500.000 | 2500.000 | 3000.000 | 4 | 312.500 |
| Clock 2 | 1562.500 | 781.250 | 625.000 | 625.000 | 937.500 | 1562.500 | 1562.500 | 2187.500 | 2500.000 | 3125.000 | 3125.000 | 3750.000 | 5 | 312.500 |
| Clock 3 | 1875.000 | 937.500 | 750.000 | 750.000 | 1125.000 | 1875.000 | 1875.000 | 2625.000 | 3000.000 | 3750.000 | 3750.000 | 4500.000 | 6 | 312.500 |
| Clock 4 | 2500.000 | 1250.000 | 1000.000 | 1000.000 | 1500.000 | 2500.000 | 2500.000 | 3500.000 | 4000.000 | 5000.000 | 5000.000 | 6000.000 | 8 | 312.500 |
| Channel | | | | | | | | | | | | | | |
| DC-250 | | | | 1 | | | | | | | | | | |
| 250-500 | | | | 1 | | | | | | | | | | |
| 500-750 | | | | 4 | | | | | | | | | | |
| 750-1000 | | | | | 1 | | | | | | | | | |
| 1000-1250 | | | | | 1 | | | | | | | | | |
| 1250-1500 | | | | | 2 | | | | | | | | | |
| 1500-1750 | | | | | | | 2 | | | | | | | |
| 1750-2000 | | | | | | | 2 | | | | | | | |
| 2000-2250 | | | | | 4 | | 3 | | | | | | | |
| 2250-2500 | | | | | | | 4 | | | | | | | |
| 2500-2750 | | | | | | | 4 | | | | | | | |
| 2750-3000 | | | | | | | | | 3 | | | | | |
| 3000-3250 | | | | | | | | | 3 | | | | | |
| 3250-3500 | | | | | | | | | | | | | | |
| 3500-3750 | | | | | | | | | | | 2 | | | |
| 3750-4000 | | | | | | | | | | | 3 | | | |

| Function | LUTs | DSPs | BRAM |
|---|---|---|---|
| Complex Multiplier | | 3 | 0 |
| Complex sine/cosine DDS | | 0 | 1 |
| FIR decimator | | n taps / (decimation rate * 2 if symmetric * 2 if half band) | 0 |
| CIC decimator | | 4 gives ~36dB alias rejection, 8 gives ~68dB at 4x decimation | 0 |
| 64-point FFT | | 6 | 0 |
| 1024-point FFT | | 12 | 4 |
| Furious Mace | ~20k | 25 | 78 |
| Furious Mace (excl IQ capture/regs) | ~9k | 25 | 18 |

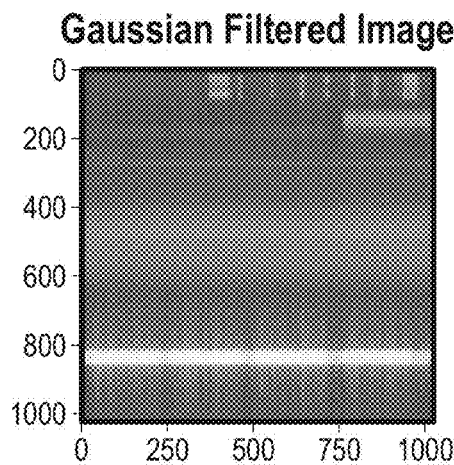
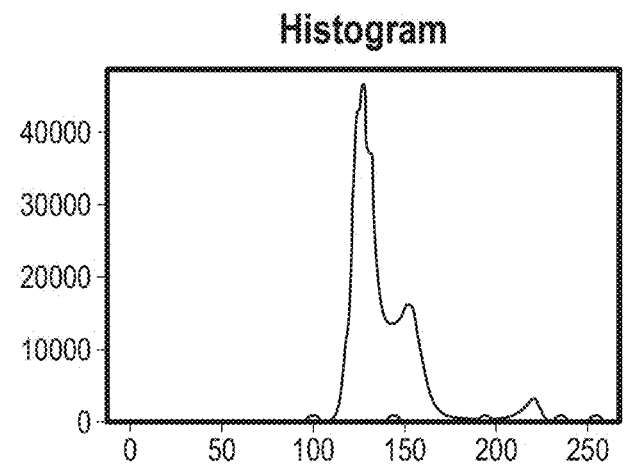
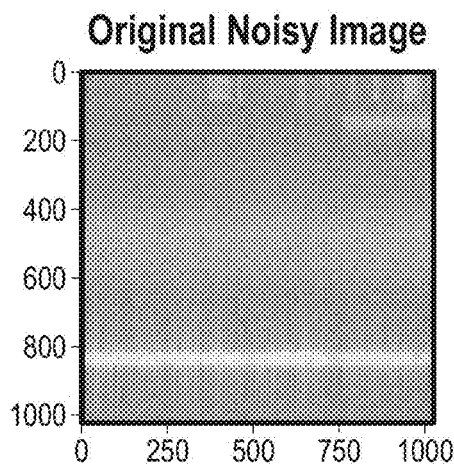
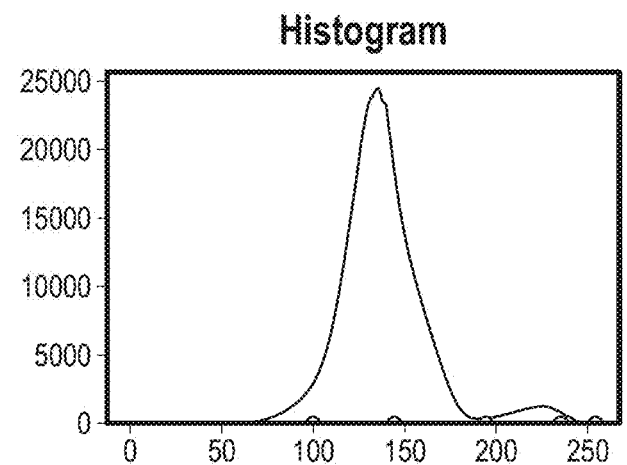
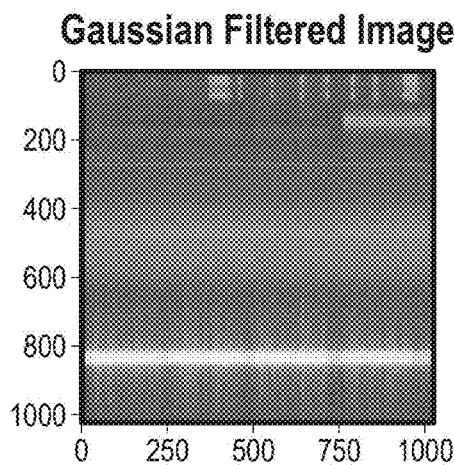
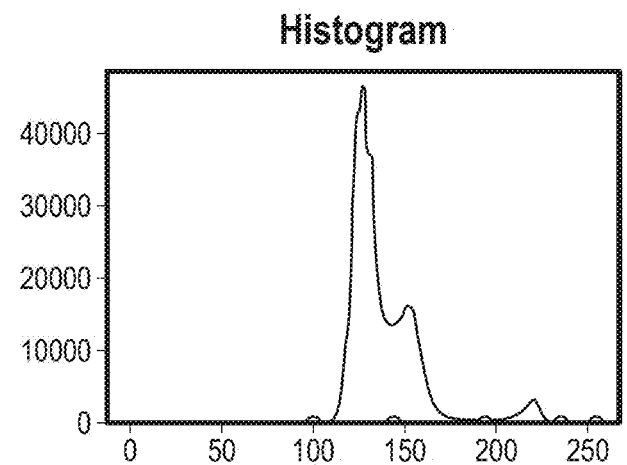
FIG. 25A

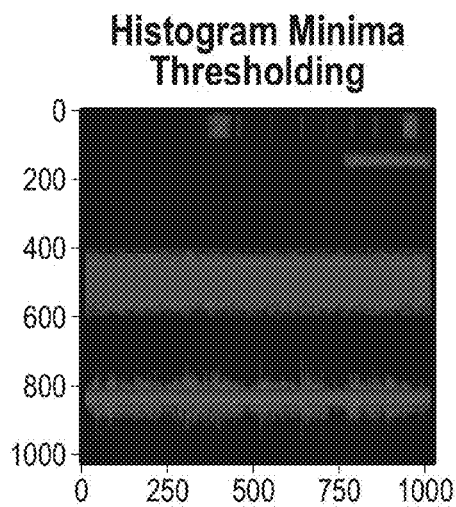
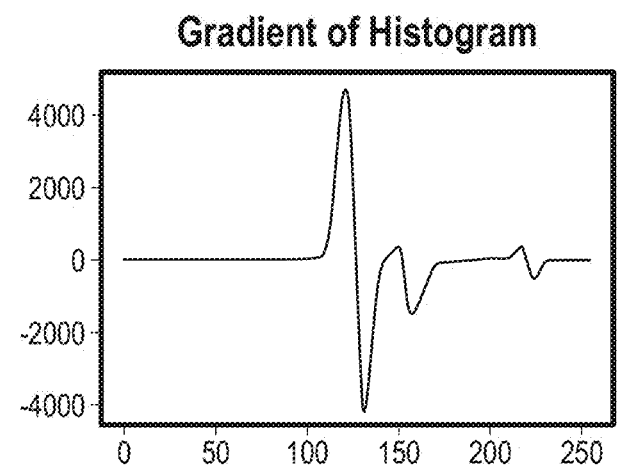
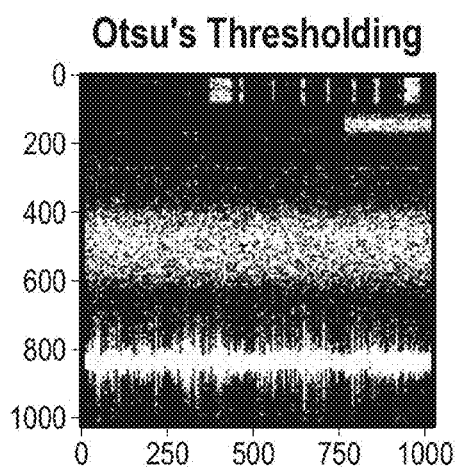
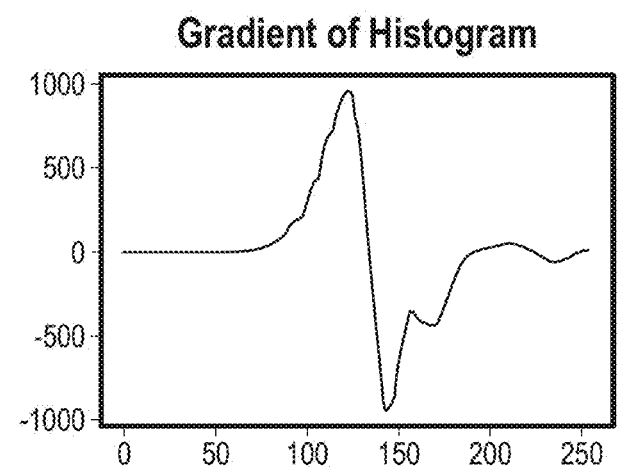
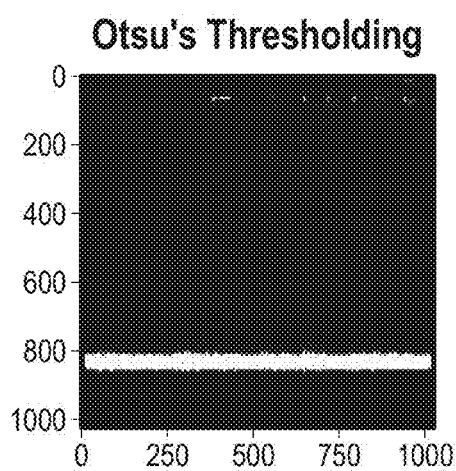
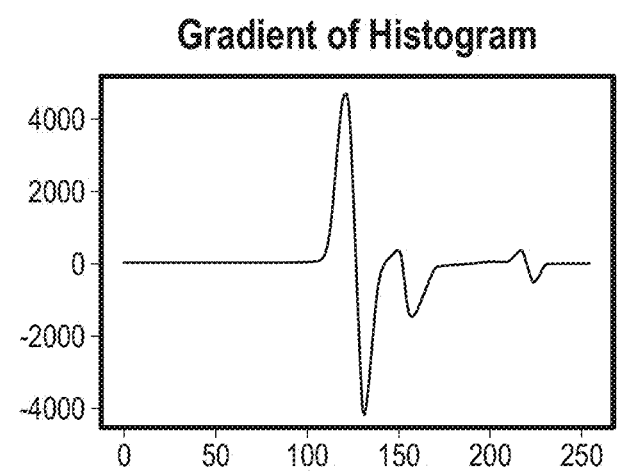
FIG. 25B

SYSTEM AND METHOD OF NOISE REDUCTION

RELATED APPLICATIONS

This application claims priority under 35 U.S.C. § 119(e) of U.S. Provisional Patent Application Ser. No. 63/262,697 filed on Oct. 19, 2021 and titled DIGITAL HIGH PROBABILITY OF INTERCEPT RECEIVER. The content of this application is incorporated herein by reference.

FIELD OF THE INVENTION

The present invention relates to systems and methods for reducing noise in signals captured by a digital receiver. More specifically, the present invention relates to reducing noise in a signal captured by a high-probability of intercept receiver adapted to monitor a wide radio-frequency spectrum with the intent of capturing a potential signal of interest that may be intermittently present. Detection is accomplished in the time-domain through the process of envelope detection where the intensity of the signal of interest exceeds the average signal intensity. Envelope detection performance may be limited by the thermal noise level which is a function of the bandwidth of the receiver.

BACKGROUND OF THE INVENTION

Conventional processing algorithms that are used to discern and identify objects in an image are adapted to reduce noise and detect and identify potential signals of interest. These algorithms rely on thresholds and other demarcations to divide the data such that statistical criteria can be derived. The process of determining the thresholds relies on calibration procedures that use reference images derived from simulated and live sources. A fully operational system will encounter signals and environments that are unlike the references used to predict the thresholds.

Therefore, a need exists for a method to improve the signal to noise ratio of the high-bandwidth receiver exposing additional signals of interest without compromising their characteristics.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a system for signal detection including a receiver, a transforming block, a noise reduction block, and an object detection block. The receiver may be adapted to provide a single channel initial dataset in a time domain over a frequency range. The transforming block may be adapted to receive the initial dataset and convert the initial dataset from the time domain to a multi-channel time-frequency domain array. The noise reduction block may be adapted to receive the multi-channel time-frequency domain array and provide a clean data set, wherein the clean data set is defined as a noise signal subtracted from the multi-channel time-frequency domain array. The object detection block may be adapted to receive the clean dataset and to provide a bounded data set, wherein the bounded data set is defined by a bounding box associated with a portion of the multi-channel time-frequency domain array containing a signal with energy above a threshold level.

The system may also include an identification process adapted (1) to receive the bounded data set from the object detection block, (2) to receive the multi-channel time-frequency domain array, and (3) to extract a signal of interest from the multi-channel time-frequency domain array wherein the signal of interest is carried by the portion of the multi-channel time-frequency domain array within the bounding box.

The noise reduction block may include a transfer function block adapted to execute a transfer function on the multi-channel time frequency domain array. The transfer function may be a double transform.

The frequency range may include a plurality of reduced bandwidth ranges.

The transforming block may include a plurality of transforming components wherein each of the plurality of transforming components may be adapted to receive one of a plurality of reduced bandwidth datasets. Each of the plurality of reduced bandwidth datasets includes a portion of the single channel initial dataset corresponding to one of the plurality of reduced bandwidth ranges. Each of the plurality of transforming components may be further adapted to convert its corresponding reduced bandwidth dataset from the time domain to a time-frequency domain and provide a corresponding channel of the multi-channel time-frequency domain array.

The multi-channel time-frequency domain array may include an aggregation of each of the channels provided by the plurality of transforming components.

Each of the channels of the multi-channel time-frequency domain array provided by each of the plurality of transforming components may be time-aligned to each of the other channels of the multi-channel time-frequency domain array provided by each of the other plurality of transforming components.

The transforming block may include a plurality of bandpass filters, each adapted to receive the initial dataset and provide one channel with a frequency range corresponding to a frequency range of one channel of the multi-channel time-frequency domain array.

Each of the plurality of transforming components includes an analog to digital converter and a down converter. The analog to digital converter may be adapted to receive one channel with a frequency range corresponding to a frequency range of one channel of the multi-channel time-frequency domain array and provide a digitized dataset. The down converter may be adapted to receive the digitized dataset and provide a plurality of complex digital channels. Each of the plurality of complex digital channels may include an in-phase portion and a quadrature-phase portion.

Each of the plurality of transforming components may further include a frequency transformer adapted to receive one of either the in-phase portion or the quadrature-phase portion of each of the down converters and provide a channel in the time-frequency domain.

The transforming block may include a processor adapted to receive the multi-channel time-frequency domain array and apply an initial transform to each channel of the multi-channel time-frequency domain array at the same point over a specified length.

Each channel of the multi-channel time-frequency domain array may be padded with at least one zero value prior to applying the initial transform.

The initial transform may be a Fourier transform.

The object detection block may be configured to divide the clean dataset into a plurality of histogram bins with each histogram bin having an energy level. The bounding box may be defined to include all portions of the dataset included in a histogram bin having an energy level above the threshold level.

BRIEF DESCRIPTION OF THE DRAWINGS

Some embodiments of the present invention are illustrated as an example and are not limited by the figures of the accompanying drawings, in which like references may indicate similar elements.

FIG. 3 is a table of the typical performance of an RF front end amplifier according to an embodiment of the present invention.

FIG. 4 is a table of the typical performance of an RF front end amplifier according to an embodiment of the present invention.

FIG. 7 is a chart of the typical performance of a low frequency power divider according to an embodiment of the present invention.

FIG. 8 is a chart of the typical performance of a high frequency power divider according to an embodiment of the present invention.

FIG. 13 is a table of specifications for a lower frequency balun according to an embodiment of the invention.

FIG. 14 is a table of specifications for a higher frequency balun according to an embodiment of the invention.

FIG. 20 is a table of the conversion bandwidth specifications according to an embodiment of the present invention.

FIG. 25 depicts the results of applying various processing algorithms to a histogram according to an embodiment of the present invention.

DETAILED DESCRIPTION OF THE INVENTION

Figure 1:
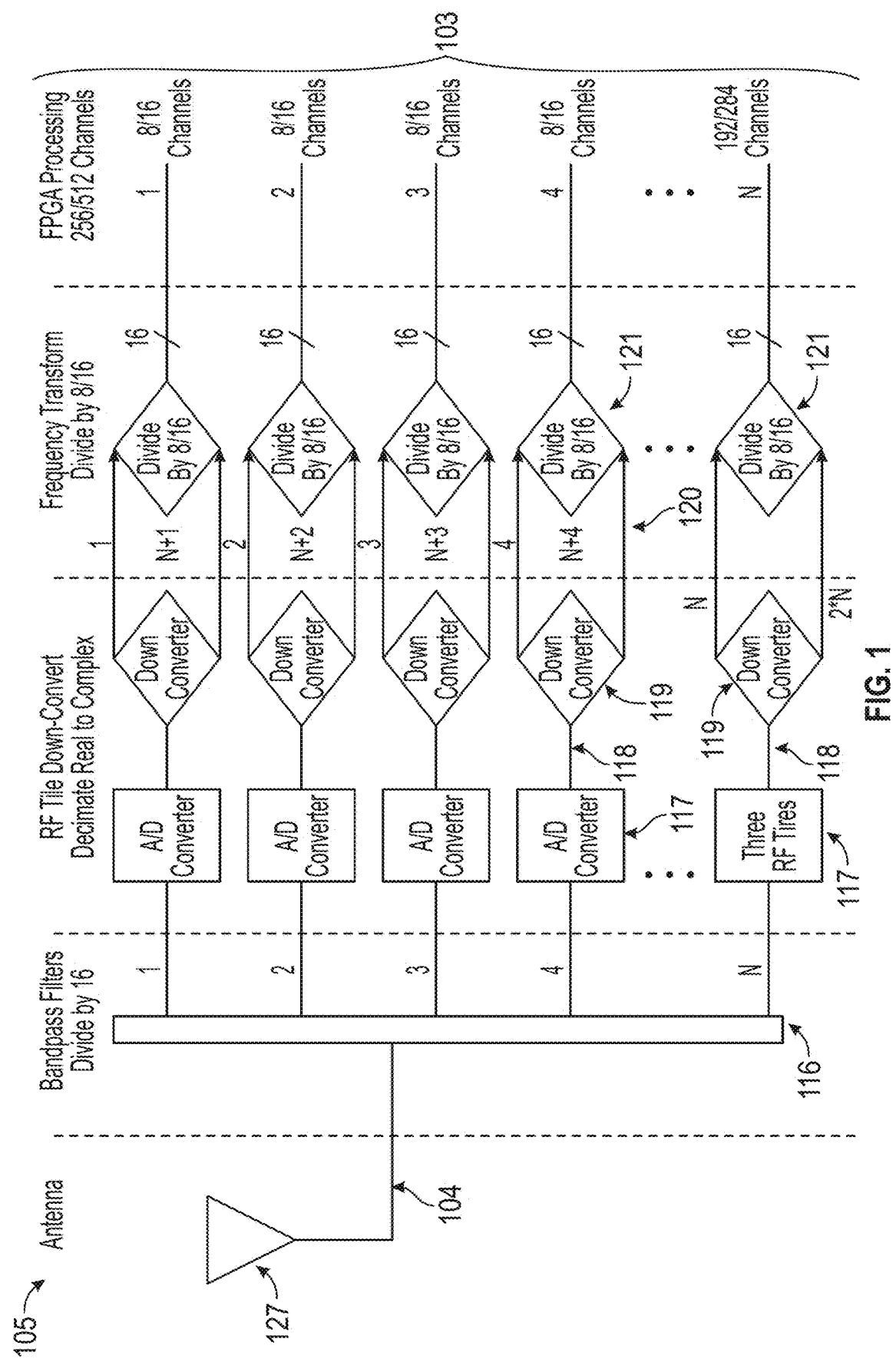
FIG. 1 is a block diagram of the transforming process architecture according to an embodiment of the present invention.
Figure 2:
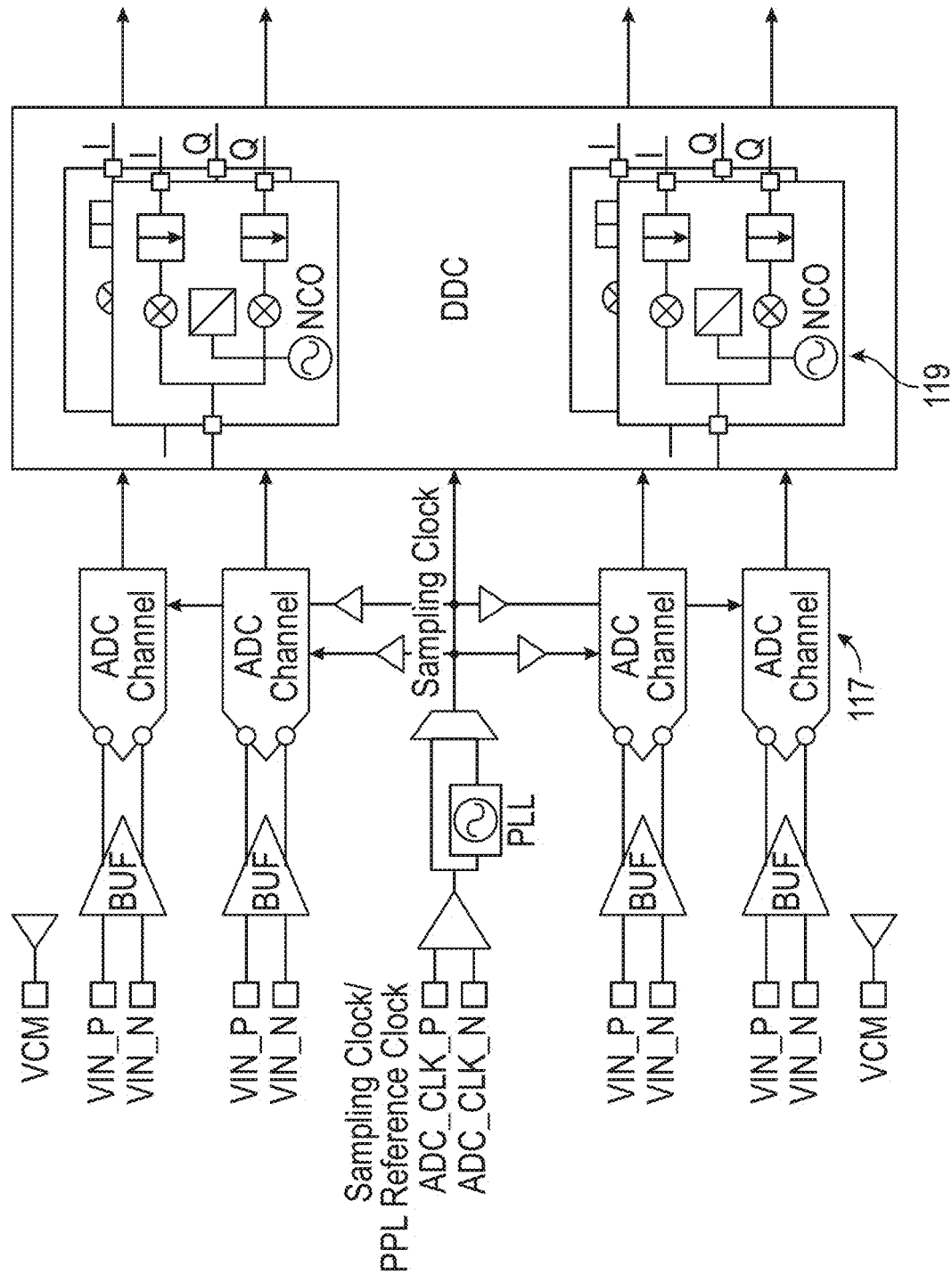
FIG. 2 is a block diagram of the RF front end according to an embodiment of the present invention.
Figure 5A:
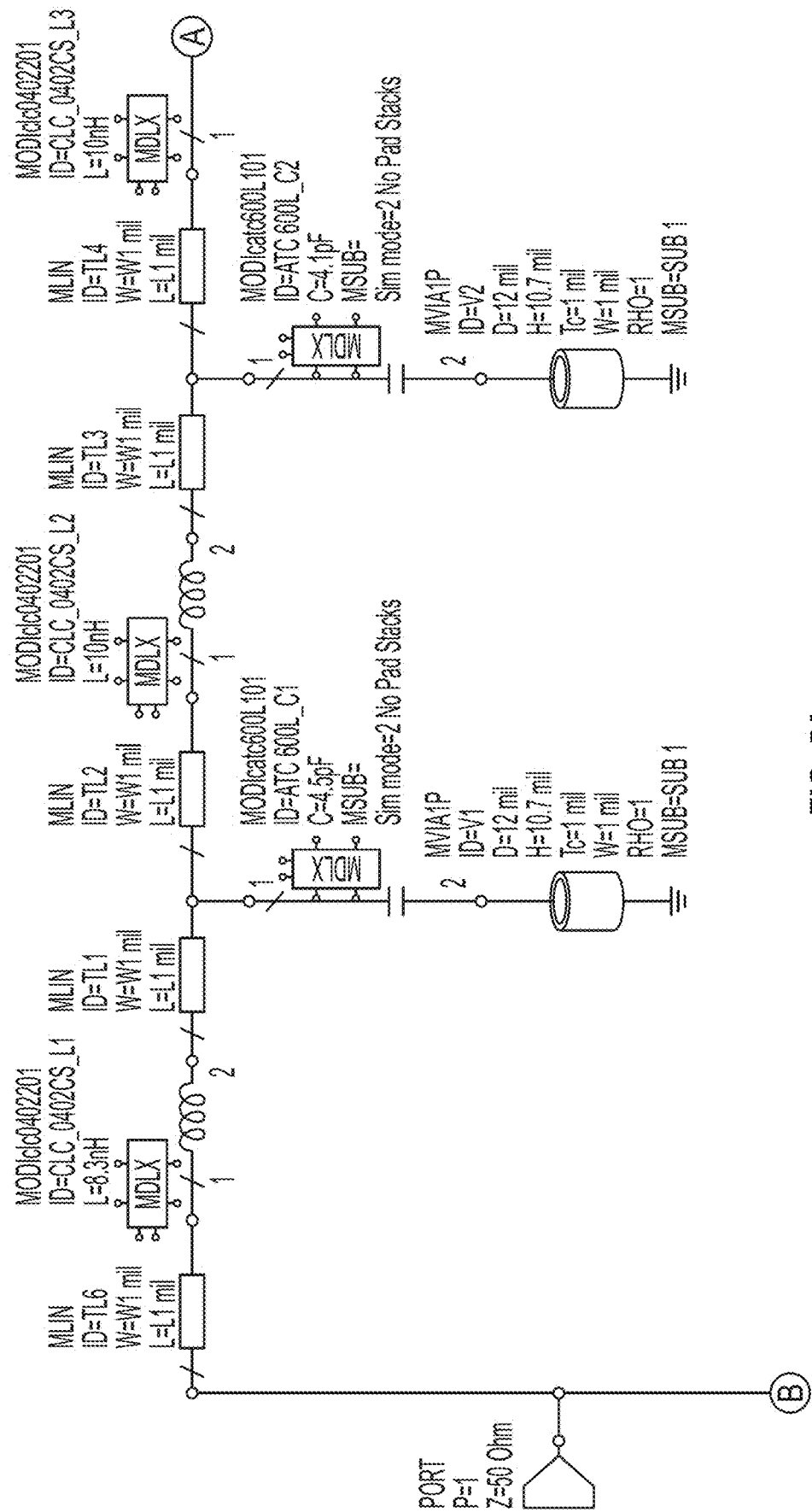
FIG. 5 is a schematic of a diplexer according to an embodiment of the present invention.
Figure 5B:
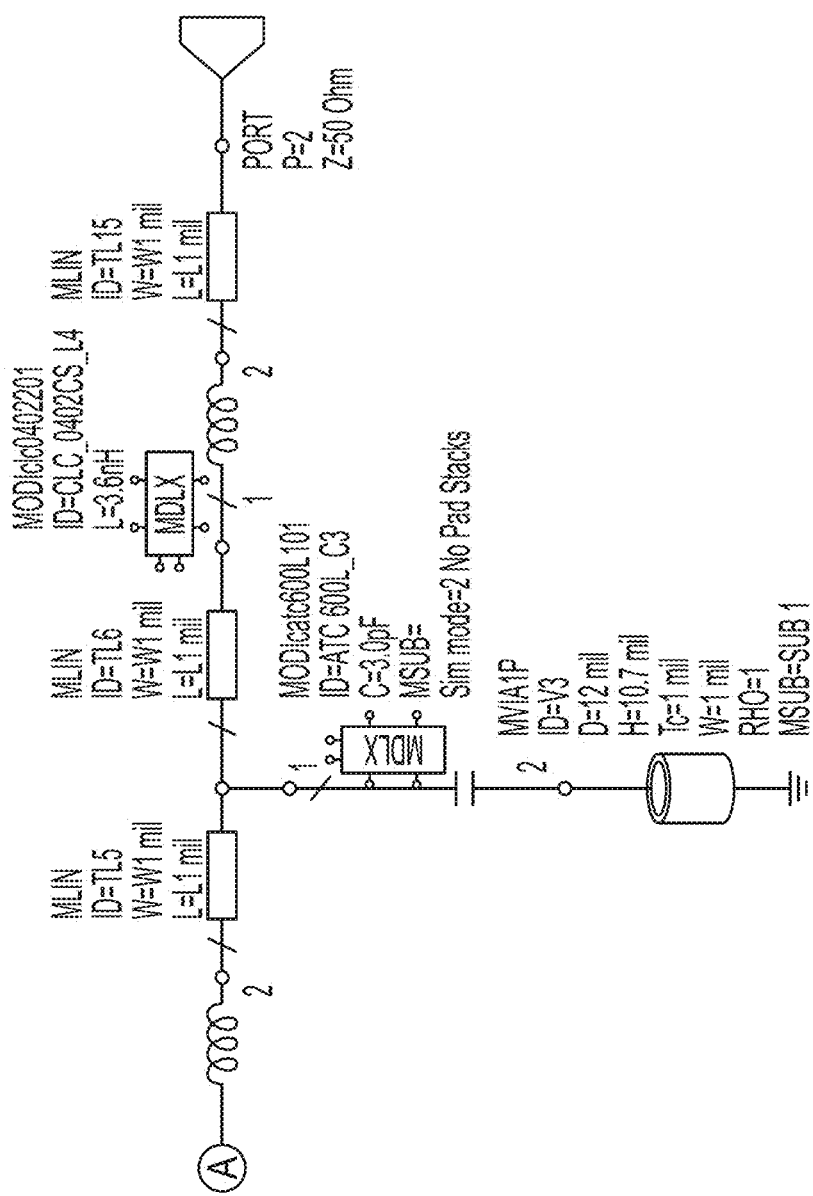
Figure 5C:
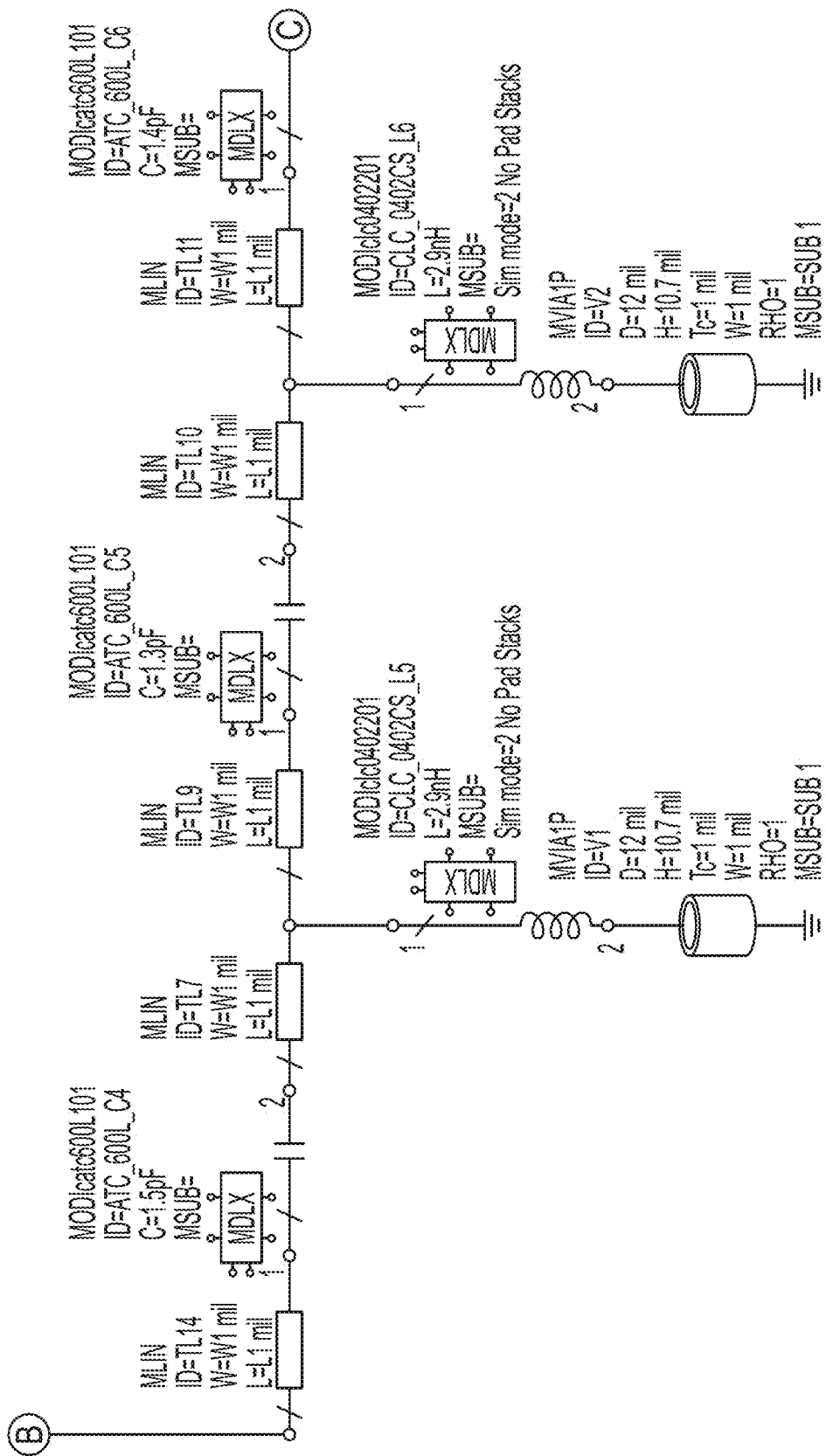
Figure 5D:
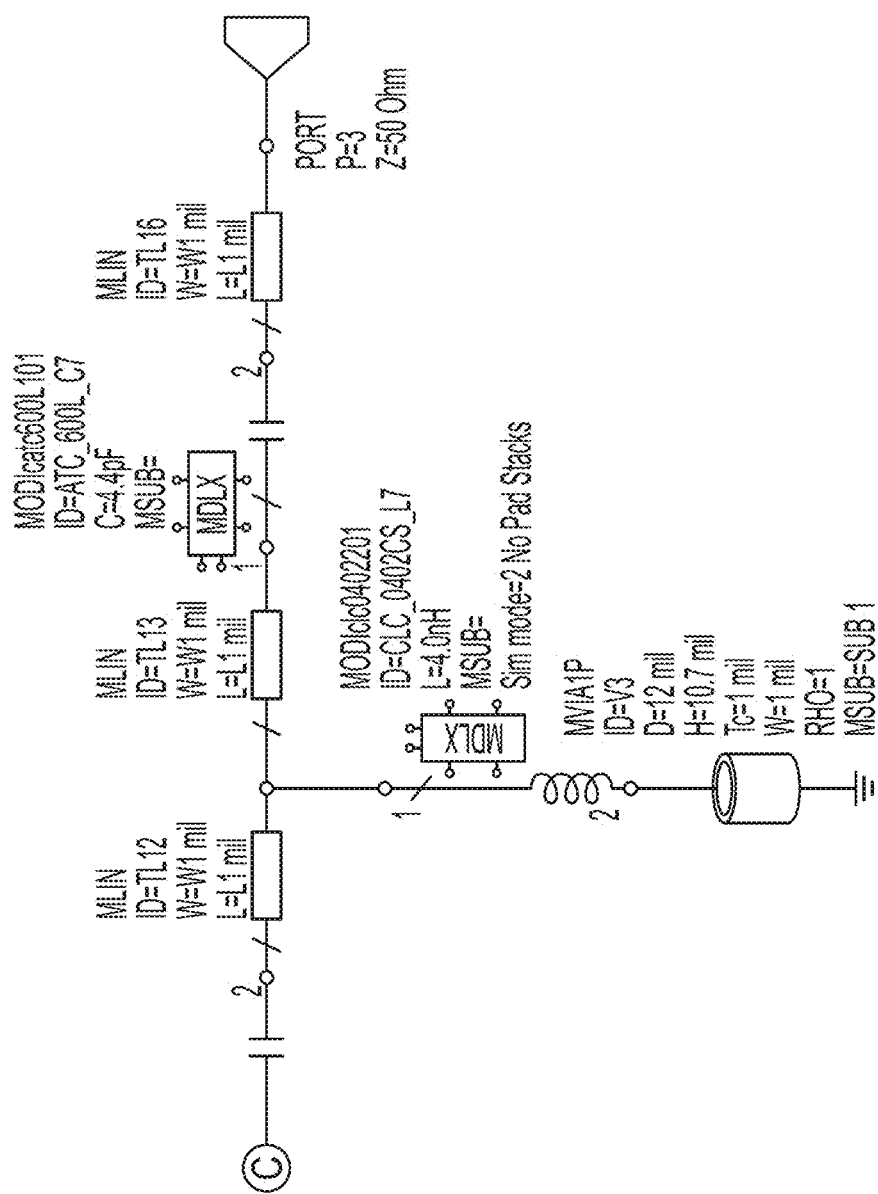

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a system and method for optimizing data captured from a receiver. In one embodiment, the system 100 may be referred to as a high probability of intercept (HPOI) receiver 100. Specifically, the HPOI receiver 100 may include a receiver and accompanying system and method to optimized transfer functions and improve identification results.

The HPOI receiver 100 may detect potential signals of interest 108 instantaneously and in real-time. The HPOI receiver 100 may stare at the entire spectrum of interest and identify any signals that rise above a derived threshold based on the measured noise floor. Signals that satisfy the threshold may be deemed signals of interest 108 and further analyzed to identify their characteristics.

The HPOI receiver system 100 may be implemented by combining advanced RF System on Chip technology with massively parallel computing implemented by a combination of FPGA fabric and a Graphics Processor Unit (GPU) to improve performance. Regardless of the architecture used to implement the inventive HPOI receiver system 100, it may provide detection, identification, and classification of information in a bounded two-dimensional time-frequency array 103 using image processing techniques, which may include implementation of a Neural Network architecture. The inventive system 100 provides an improvement of better than 10 dB of sensitivity for the same overall bandwidth versus a conventional analog implementation.

An implementation of the inventive method may compute a two-dimensional time-frequency array 103 from an initial data set 104 captured by a receiver in the time domain. The two-dimensional time-frequency array 103 may reveal information that may otherwise be obfuscated by thermal noise intrinsic to the wide bandwidth of the initial data set 104. The net result is a significant improvement in signal to noise ratio over conventional time-domain solutions.

This process may be analogized to an image processing technique. After transforming the initial data set 104, which is in the time domain, into a two-dimensional time-frequency array 103, the two-dimensional time-frequency array 103 resembles a monochrome image with potential signals of interest bounded in both time and frequency and set in a uniform background of noise. Processing of the two-dimensional time-frequency array 103 may leverage algorithms designed for the purpose of discerning objects in images by performing noise reduction and detection of potential signals of interest apparent in the reduced noise signal. Potential signals of interest 108 may be extracted from the two-dimensional time-frequency array 103 and processed in both, or either, of the time-frequency domain and the time domain for identification and classification.

The inventive system may include processing components to receive an initial data set 104 from a sensor system, which may be the receiver, and transform that time-domain data set 104 into the two-dimensional time-frequency array 103, which distributes the noise and background over a new space, while the information of interest remains concentrated to a bounded region. This transforming process 105 results in an improvement to the effective signal to noise ratio.

After the transforming process 105 is applied, the static background information may be clustered in the lowest frequency bin and the noise tends to distribute over all the frequency bins. The information of interest, since it is bounded in time and frequency, is clustered in a region of time-frequency space.

Once in this time-frequency space, the characteristics of the data represented in the two-dimensional time-frequency array 103 is further analyzed to discern the characteristics of the noise such that is can be removed from the two-dimensional time-frequency array 103, or underlying initial data set 104, without degrading the signal of interest 108.

The transformed space of the two-dimensional time-frequency array 103 initially improves the signal to noise ratio of the potential signal of interest 108 contained in the initial data set 104 such that it can be differentiated from the noise and background using a trained Fully Convolutional Neural (FCN) network. The FCN network may bound and separate the noise and background from correlated information such that an accurate transfer function of the noise can be derived. With an accurate estimate of the noise, a transfer function process may be tailored to remove the noise without affecting the characteristics of the information contained in the signal of interest 108.

The two-dimensional time-frequency array 103 may also provide a baseline improvement from which additional noise reduction can be applied. The present method, which utilizes a double transform, offers a significant improvement in signal to noise ratio over algorithms that operate only on the original time-domain data set.

An FCN network may be uniquely suited to the task of assessing imperfect information to derive useful results. The FCN network may be designed and trained to evaluate many combinations of identifying characteristics of a signal of interest 108 or information of interest and directly produce the estimated classification and the confidence of the estimated classification. However, the FCN network must be trained to perform this task using a set of images, represented as two-dimensional time-frequency arrays, that contain expected information and an estimate of the expected noise and channel characteristic of each two-dimensional time-frequency array. FCN network training is a significant effort and must be approached with care to avoid under training, over training, and false representations of the information space. Conventional assessment of training performance looks for convergence driven by the errors in classification.

Even with significant training, the resulting FCN network is only as good as the original training data provided to the FCN network and the process that determined convergence to a working FCN network. As real data is processed, and real signals are evaluated, any shortcomings of the FCN network and the training that produced it must be assessed for continuous improvement.

The inventive method may include a usable set of criteria and metrics for continuous evaluation of the statistical processing methods used to detect, identify, and classify signals of interest such that the confidence level of the results can be understood in the context of the potential shortcomings of the initial calibration and FCN network training. Continuous assessment and improvement may make the system more robust in future unknown environments and when presented with signals that cannot be classified with known information.

To obtain a data set for review, a receiver may capture samples over a wide bandwidth. In some embodiments, the bandwidth may be up to 4 GHz. Data is captured over a wide bandwidth to maximize the likelihood that a signal of interest 108 is detected and classified by the receiver. The initial data set 104 generated by this receiver may exhibit poor signal to noise ratio (SNR) because the wide bandwidth exposes the samples to significant thermal noise and may produce in excess of 8 giga-samples of continuous information.

To overcome these limitations, the HPOI receiver 100 may utilize a transforming process 105 to subdivide the spectrum into multiple channels, each exhibiting a lower thermal noise by virtue of the reduced bandwidth of each of the channels, thereby offering a much lower overall noise level than previous single channel implementations. The parallel outputs of the transforming process 105 may be time-aligned and streamed to create a two-dimensional time-frequency array 103, a spectrogram, that can be processed with two-dimensional algorithms. Since the majority of the information in the initial data set 104, and resulting two-dimensional time-frequency array 103, is composed of noise, a noise reduction process 110 followed by an object detection process 115 may be applied to identify samples that are potentially signals of interest 108. This transformation and noise reduction may also serve to reduce the original 8 giga-samples per second of data down to a manageable size that can be post-processed with available capability.

After potential signals of interest 108 are detected, they may be analyzed using multiple algorithms to discern the characteristics and the potential source of the signal. A Graphics Processor Unit (GPU) may be incorporated in the design to take advantage of the increased computing efficiency and reduced power consumption of the highly-parallel architecture. In one embodiment, by way of example, and not as a limitation, a radio frequency system on chip (RFSOC) with built-in high-performance Analog to Digital Converters may be utilized.

Such an RFSOC architecture may perform a wideband digital conversion early in the reception process and perform the down conversion, filtering, and decimation in the digital domain rather than utilizing a more conventional method, in which the converter follows down conversion and analog filtering. The RFSOC architecture may offer a unique opportunity to implement many parallel channels in a field programmable gate array (FPGA) that follows the down converter decimator at significantly higher efficiency than the analog counterpart.

A transforming process 105 may be used to divide the data sampled over the full bandwidth into many orthogonal channels. This transforming process 105 may produce a two-dimensional time-frequency array 103, which may be referred to as a spectrogram. The spectrogram, which may resemble a monochrome image, may be processed using noise reduction and object detection processing. This processing may reduce the data rate to a manageable level. The reduced data stream may then be further analyzed to identify and classify signals of interest.

The process of sampling an energy source using a receiver, such as a sensor or energy conversion device, produces a data set 104 of N dimensions consisting of energy intensity values repeated at the interval rate between the samples in the data set 104. The sampled data set 104 may contain information of interest, which may be defined as bounded by both time and frequency that is potentially obscured by various forms of random noise and other content not of interest to the end user. The transforming process 105 may perform a mathematical transform to a subset of N dimensional samples in the time domain, which results in a two-dimensional time-frequency array 103, which is a distribution of the energy over the time period of the sample, divided into N dimensional bins. Each bin represents the energy in the sample set over a portion of the frequency spectrum. The period between time samples and the number of time samples used to perform the transform defines the spectral coverage and the bandwidth of each frequency bin. The transform is repeated for each subset of time samples located at the same point in the data space. The output of the transforming process 105 is a two-dimensional time-frequency array 103, which is the initial data set 104 with an expanded dimension representing the spectral distribution propagating over time.

For optimum performance, the initial data set 104 may be transformed to, or obtained in, a resolution that is consistent with the expectations of processing performance of the system. In one embodiment, the data may be represented as a sixteen-bit signed integer. The initial data set 104 may also be scaled to occupy the full range of the defined format.

To take advantage of fast transform algorithms, the data space of the initial data set 104 provided to the transforming process 105 may be extended or interpolated to a power of two along each of the dimensional axes. In such an embodiment, discontinuities caused by extension of the space through zero padding is offset by the windowing function. The interpolation process requires poly-phase interpolators which are calculation intensive but do not insert additional discontinuities.

The transforming process 105 may apply an initial transform to the data set 104. For an N dimensional array, the initial transform is applied to the same point in the data set 104 over the specified length, N. In one embodiment, the initial transform may be a Fourier transform. The Fourier transform may be selected because it does not require tailoring to the characteristics of the noise.

The transforming process 105 may take advantage of the processing gain resolved by consolidating the bandwidth of the data set 104 sample to only that number required to represent the signal of interest 108. This is possible because potential signals of interest 108 must be bounded in both time and frequency. In addition, the noise contained in the data set 104 is likely distributed over the entire transformed data space such that it can be isolated from the signals of interest 108 using a thresholding noise reduction process. Using the inventive system and methods, the wideband receiver may exhibit the noise characteristics of a narrow band receiver.

In one embodiment, the transforming process 105 may include the operations performed by the architecture shown in FIG. 1. The transforming process 105 may divide the spectrum of the initial data set 104 into many parallel channels, depicted as N channels in FIG. 1, using a bandpass filter 116. By way of example, and not as a limitation, there may be hundreds of parallel channels. Spectral division may be performed in multiple domains as described by FIG. 1. The first bandpass filters 116 may divide the incoming RF data set 104 into N bands each driving an analog-to-digital converters 117. In one embodiment, the analog-to-digital converters 117 by be provided by a single RFSOC and there may be 16 bands, each driving a respective analog-to-digital converter 117. After conversion to the digital domain, each of the sampled data channels 118 may be provided to a separate down converter 119 and decimated into N complex digital channels, each with an in-phase and quadrature-phase portion for a total of 2*N channels 120. By way of example, and not as a limitation, each sampled data channel 118 may be decimated into 16 complex digital channels, each with an in-phase and quadrature-phase portion for a total of 32 channels. A channel may be sampled with a sample clock rate double the data rate, plus a guard band sufficient to accommodate the profile of the filters in the down converter. The sufficient guard band is known to those with skill in the art. Again, by way of example, and not as a limitation, a channel with 125 Megahertz of spectrum may be sampled with a sample clock of 266.66 Megahertz.

Each of the 2*N channels 120 output by the down converters 119 may be further divided using a frequency transformer 121. Each of the 2*N channels may be divided into M channels for a total of 2*N*M channels. These 2*N*M channels may be time aligned and collectively form the two-dimensional time-frequency array 103. By way of example, and not as a limitation, there may be an embodiment with sixteen analog-to-digital converters 117, the 32 channels received by the frequency transformers 121 may each be divided into 16 channels, resulting in 512 channels output to form the two-dimensional time-frequency array 103. The number of channels that the frequency transformers 121 may divide the 2*N channels into may be limited by the architecture on which the system 100 is implemented. In one embodiment, by way of example, and not as a limitation, the frequency transformers 121 may divide each of the 2*N channels into 8, 16, 32, 64, 128, 256, or 512 channels. Each of the channels may be time aligned with the other channels to provide a parallel stream of information covering 4 Gigahertz of contiguous spectrum, collectively, the channels form the two-dimensional time-frequency array 103.

In an embodiment with an RFSOC device having four converter tiles, each with a bandpass filter, and with each converter tile supporting four analog-to-digital converters 117 and four down converters 119, which may also be decimators, the design may support sixteen analog data streams. In such an embodiment, as shown in FIG. 1, the antenna 127 may provide the initial data set 104, which may be an analog signal having a spectrum. By way of example, and not as a limitation, the spectrum of the initial data set 104 may be 0-4 GHz. The receiver 127 may provide the initial data set 104 to a bandpass filter 116, which may divide the initial data set 104 into N subsequent analog data streams, each of which may be provided to one of the analog-to-digital converters. By way of example, and not as a limitation, in one embodiment, the bandpass filter 116 may divide the initial data set 104, having a spectrum of 0-4 GHz, into sixteen equal channels, each have a 250 MHz spectrum. Each of these channels may be provided to a respective analog-to digital converter 117. In such an embodiment, a sample clock with a rater higher than 500 MHz should be utilized.

In addition, the transforming process, may provide a low-noise input gain stage to set the noise figure, an attenuator to allow for customization of the system gain, and a final gain stage to set the noise floor at just above the spurious-free dynamic range of the analog-to-digital converters 117.

In one embodiment, an architecture may be employed having 8 RF tiles, in which each RF tile will drive eight channels into the FPGA fabric for a total of 32 channels input to 32 analog-to-digital converters 117 and producing 1,024 (2*32*16) channels to form the two-dimensional time-frequency array 103. Such an architecture may operate at a maximum sampling rate of 2.5 GSPS.

Each RF Tile in an RFSOC may implement the structure shown in FIG. 1 and perform the initial conversion, downconversion, and decimation functions of the transforming process 105 to reduce the data rate and the associated sample clock of the initial data set 104 to a rate that is easily handled by the FPGA fabric, or other processing architecture or hardware.

The frequency transformers 121 may utilize a number of different transform techniques. A particular transform technique may be selected for use in an application because it provides the best performance, lowest resource utilization, or optimizes these two parameters. Possible transform techniques, by way of example, and not as a limitation, may include a fast Fourier transform (FFT) or time domain conversion.

An FFT may produce the desired result using the simplest implementation method as design libraries exist to offer pipelined implementation of the FFT. Such an implementation may limit the division into a power of two with the expectation of achieving at least thirty-two additional channels and possibly sixty-four. Because the input to the FFT is complex, a complex FFT is utilized. However, subsequent processing would benefit and be simplified by a single output of the FFT for each frequency bin not centered at DC, which is typical of a complex spectrum. The FFT function processes a fixed set of data points and either end of the data set will have a discontinuity. Without accounting for the discontinuity, the resulting channels will have a distribution of additional noise from these discontinuities. Since the data is likely primarily random, the expectation is that the additional noise will be well below the thermal noise floor, but the actual additional noise will vary for each FFT conversion. Discontinuities can be addressed using two different methods: windowing and overlapping FFT implementation.

The windowing process applies a smooth transfer function (by way of example, and not as a limitation, hamming, gaussian, or the like) to the data set that reduces the effective energy of the samples at the end points. This significantly reduces the noise level caused by the discontinuity but smears the energy between bins. Because signals of interest 108 are likely less than the width of single bin, the smearing may distribute the energy of the signal of interest 108 into multiple bins, effectively reducing the signal to noise ratio. The windowing function may be used but may not result in any improvement in detection sensitivity over the non-windowed implementation.

The overlapping FFT implementation may apply a flat top windowing function to the data set, which retains the energy in the center portion of the data set. The resulting FFT may yield coefficients with less smear but at the expense of effective channels. A subsequent FFT may then operate on a data set shifted by half the length such that all samples are converted at full power. This may yield better performance over the smooth window function at the expense of requiring additional computation. The conversion method selected (no window, smooth window, flat top window) may be based upon the performance of the three respective methods in a particular application of the inventive system and method.

Another frequency transform method that may be utilized is a time domain conversion. A time domain conversion may down-convert, filter, and decimate the incoming data stream into multiple parallel channels in the time domain. Channel bandwidth and center frequency may be designated such that the individual channels overlap to account for the guard band allocated for the bandpass filters applied to the data prior to decimation. The resulting channel output may yield full performance for the channel bandwidth selected. The expectation is that the total number of channels is greater than ten and, in one embodiment, on the order of fifty. In such an embodiment, the required decimation rate lends itself to implementation using cascaded integrator comb (CIC) filters for the overall process to significantly reduce the computational requirements. A simple finite impulse response (FIR) filter may be applied to the decimated data stream to filter the remnants of the CIC decimator.

After data is output from the frequency transformer 121, the data may be processed by the system 100 to identify a signal of interest 108. In one embodiment, data may be processed using FPGA fabric architecture, which may be included in an RFSOC, multi-core processors, and/or a programmable graphics processor unit supported through a multilane PCI Express interface. In one embodiment, part of the FPGA fabric may be assigned to provide the transforming process 105 architecture, which completes the channelization process as depicted in FIG. 1. The noise reduction process 110 and object detection process 155, which are performed to reduce the data set as much as possible before it is transferred to the graphics processor unit (GPU) for identification and classification, may also be performed using FPGA architecture found in the same FPGA or in a different FPGA.

Once the initial data set 104 samples are processed by the transforming process 105 and the two-dimensional time-frequency array 103 is output by the process 105, this signal array 103 may be provided to the noise reduction process 110. The two-dimensional time-frequency array 103 may contain signals of interest 108 that are bounded in time and frequency. However, the data within the signal of interest 108 may contain noise and background information likely distributed over all samples. To achieve the highest contrast between the potential signals of interest and the background, the noise reduction process 110 is applied to the two-dimensional time-frequency array 103.

The majority of the captured spectrum present in the two-dimensional time-frequency array 103 is dominated by noise and background information. A set of noise reduction algorithms, collectively, the noise reduction process 110, may be applied to the data of the two-dimensional time-frequency array 103 to increase the contrast ratio between any signals of interest 108 and the background noise. Noise and object detection processes may be affected by the characteristics of the information contained in the data stream and the background noise. These characteristics may drive detection and optimization methods. Because the transfer function of the original signal of interest 108 is not available, a method must be utilized to estimate the transfer function and extract the signal of interest 108 from the two-dimensional time-frequency array 103.

The initial noise reduction process 110 seeks to further improve the contrast ratio between potential signals of interest 108 and the noise and background to be removed from the data array 103. This initial noise reduction process 110 is not expected or intended to retain all of the characteristics of the signal of interest 108 so an aggressive algorithm may be utilized by the initial noise reduction process 110 to yield optimum contrast between signal and noise. The improved contrast ratio obtained from an aggressive algorithm may be required or beneficial for subsequent processes to separate the noise from a potential signal of interest 108 with a high degree of confidence.

After noise is reduced, a clean data set 122 may be provided to the object detection process 115 by the noise reduction process 110.

The object detection process 115 may include one or more image detection algorithms. In one embodiment, an image detection algorithm may divide the clean data set 122 into histogram bins and compute a threshold to determine if there are any remaining samples that satisfy the criteria for further analysis. Based on the computed thresholds, a bounding box may be implemented to delineate the set of samples that will be extracted from the clean data set 122. The bounding box may be expanded to ensure that sufficient samples are kept. The object detection process 115 may include a trained FCN network, which may operate on the clean data set 122 received from the noise reduction process 110 to separate the noise from the signal of interest 108 for application specific training. The FCN network may then produce a set of thresholds that are applied to the initial data set 104 to bound the regions of interest. This bounded data set 124 may be provided to the identification process 123. The remaining information outside the bounded regions may represent noise and background that is not of interest.

The identification process 123 may receive a bounded data set 124 from the object detection process 115. The identification process 123 may implement one or more identification algorithms, which may apply statistical methods to the time and spectral properties of the bounded data set 124 to determine if the information contained in the bounded data set is a signal of interest 108. It should be noted that not all valid signals encountered and identified will be signals of interest 108.

A signal of interest 108 identified by the identification process 123 may be provided to the classification process 128. The classification process 128 may perform one or more classification algorithms to assess the signal of interest 108 gleaned from the identification process 123. The classification process 128 may compare data related to the signal of interest 108 to information contained in a database 126 of know signals and signal types. Signals of interest 108 that are similar to known signals contained in the database 126 will be classified with a statistical significance and tagged for further analysis.

A FCN network may be trained to identify or classify signals of interest 108 from the time-frequency data extracted from the initial data set. The FCN network may be implemented by a GPU and utilized to develop a noise transfer function, which may be implemented by the noise reduction process 110.

To determine the noise transfer function, the FCN network may define regions that are not of interest and that are comprised mostly of noise. The FCN network may apply a matched filter process to the clean data set 122 to optimize the signal to noise ratio between a known signal characteristic and the noise also present in the data. The FCN network may extract information from the clean data set 122, which is noise or background and does not contain a signal of interest 108. Because of this, the signal characteristic used in the matched filter process of the FCN network may be the null function and, as such, is known. The optimum noise transfer function can be estimated using the bounded space data set determined by the FCN network. The bounded data set derived from the matched filter process may be applied to derive a noise transfer function, which can now be used to implement a noise reduction process 110 to the two-dimensional time-frequency array 103, resulting in an optimized noise reduction process 110.

The derivation of the noise transfer function supports optimal reduction of noise in the two-dimensional time-frequency array 103 by virtue of the optimization of the signal to noise ratio accomplished by the matched filter process of the FCN network. Applying this matched filter process to the initial data set 104, which is in the time-domain, may yield consistent results but will likely not perform significantly better than conventional algorithms that rely on thresholds computed from the two-dimensional time-frequency array 103 histogram.

However, the unique bounded characteristic of the initial data set 104 results in a reduction in noise just from the initial transforming process 105, which distributes data over the frequency domain. Operation of the noise reduction process 110 on the transformed two-dimensional time-frequency array 103, utilizing the noise transfer function derived by the FCN network will further reduce noise, yielding an improvement over the time-domain only process.

The disclosed training method may be utilized to assess different processing algorithms applied to the sampled data set for the purpose of measuring their performance. The results of different processing algorithms may be optimized without significantly degrading the original information to provide the best performance. Specifically, estimated transfer functions may be optimized to improve results. Once a noise transfer function is selected, it may be implemented by the noise reduction process 110.

Figure 30:
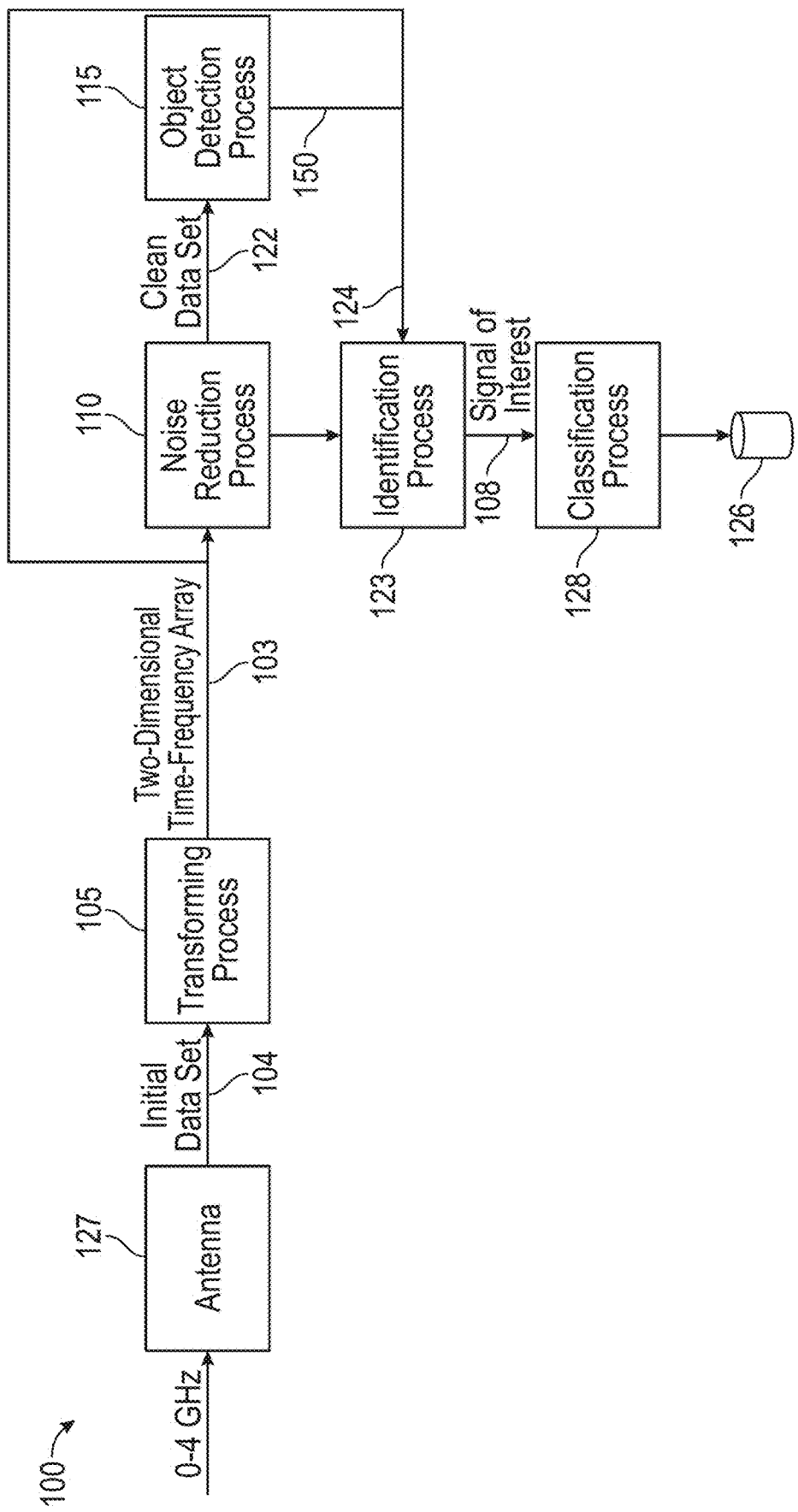
FIG. 30 is a block diagram of the high probability of intercept receiver system according to an embodiment of the present invention.

Continuing with FIG. 30, the present method may utilize a transforming process 105, which converts the time-domain data set 104 into a two-dimensional time-frequency array 103, a spectrogram, spanning time and frequency. The spectrogram may be created by dividing the initial data set 104 into multiple orthogonal channels using known digital channelization techniques as discussed above. The transformed data space of the two-dimensional time-frequency array 103, even without any noise reduction, offers increased contrast between the background noise and any artifacts that are revealed as a function of this process.

In determining the processing algorithms to be utilized by the noise reduction process 110, the FCN network may apply a set of algorithms to the two-dimensional time-frequency array 103 to reduce the size of the data, detect signals of interest, identify the characteristics of the signal of interest and classify the characteristics against a set of known signals. The applied algorithms may be based on, or derived from, conventional two-dimensional image processing algorithms and a deep learning FCN network may be trained to perform the detection and identification functions. The FCN network may be configured to estimate the most likely classification of a signal of interest 108 discovered from the initial data set 104. The FCN network may perform this function even when the data set 104, and the signal of interest 108 contained therein, are distorted by the effects of propagation though an imperfect time-space channel that may be constantly changing due to (1) movement of the source or the detector, (2) variation in the transmitting equipment, (3) changing environmental effects, or the like.

The FCN network may operate from a baseline developed through training previously performed by the FCN network using models that are representative of the data set 104 expected to be processed. The models provided to the FCN network may be scaled to a dimensional structure using a Fourier transform so the structure matches the two-dimensional time-frequency array 103 expected to be analyzed.

A generic FCN network implementation may train the FCN network to detect and identify noise in the data space. Noise samples may be grouped and extracted by type. A transfer function or spectral distribution may be calculated for each type of noise identified from the grouped samples. The generic FCN network 170, once trained, may provide acceptable performance for data sets 104 with undefined or unknown signals of interest 108 that meets the time and frequency boundary requirements.

For best performance, the training models provided to the FCN network for training may result in the detection and identification of samples unique to the specific application in addition to detecting noise samples. The additional detection process may segregate the samples that don't fall into either category identified as noise or as signals of interest 108. Noise transfer functions or spectral distributions may be calculated for the samples identified as noise and the uncategorized samples that fall out of the process. An application specific FCN network may produce the highest level of performance.

Regardless of the training method utilized, the net output of the FCN network is a bounded space data set that contains only noise such that the reference transfer function for the match filter process is the null function. For best operation, the FCN network should produce a bounded space data set that crosses the entire frequency spectrum. A function derived by the FCN network that describes a reduced spectrum will only address the noise in this reduced spectrum.

Noise reduction may be defined as the difference in power between a signal of interest 108 and the noise content for a given data set. Sensor systems that capture a wide spectral bandwidth, which includes one or more signals of interest 108 that occupies a smaller spectral distribution, will capture significant noise content in the process of capturing the signal(s) of interest 108. The signal of interest 108 is present in the captured data but may be obscured by the noise.

Several processes may be applied to the initial data set 104 in either the time or frequency domain to optimally remove noise with minimal effect on the original signal of interest 108 contained in the initial data set 104. These processes may be used alone or any in combination by the noise transfer function derived by the FCN network. The noise reduction process 110 may include any combination of the following processes: (1) spectral subtraction noise reduction; (2) match filtering noise reduction; and (3) wavelet noise reduction.

The spectral subtraction noise reduction process may be applied to the two-dimensional time-frequency array 103. The spectral subtraction noise reduction process assumes that the additive noise of the data set 103 is stationary and uncorrelated with respect to the signal of interest 108. The spectral subtraction noise reduction process may operate on the two-dimensional time-frequency array 103 in the time domain or the frequency domain. The time domain based spectral subtraction process convolves the derived transfer function with the original two-dimensional time-frequency array 103 to effectively remove noise by filtering. The frequency domain based spectral subtraction process operates on the transformed frequency space by subtracting data below a threshold defined by the transform of the time-domain noise transfer function. In the frequency domain, this noise appears as a uniform additive energy level for each frequency bin. The energy level can be subtracted and the remaining frequency coefficients can be scaled back to the original dynamic range. The coefficients are then restored to the time domain. For each derived channel, the base noise level distribution over the particular spectrum will be estimated from the histogram of the data set.

A matched filter process is a transfer function that, when applied to the data, produces the optimum signal to noise ratio for that filter order. The transfer function calculation requires knowledge of the transfer function of the original signal. For this application, the noise transfer function of the original noise signal may be derived using the FCN network training as described above or the noise transfer function may be estimated.

The Wiener filtering noise reduction process is a specific application of a match filter process, in which a transfer function is applied to the data space where the coefficients of that function are adapted from the mean squared error (MSE) derived from the comparison of filter output to the reference response derived from the FCN network process. The performance of the Wiener filtering noise reduction process is driven by accurate estimation of the transfer function of the noise content, which may be derived using the FCN network training. Much like the spectral subtraction process, the Wiener filtering noise reduction process applies a filter to the data to remove the noise. However, the filter characteristics are continuously updated by the MSE process.

The wavelet noise reduction process may include three parts: (1) a time-frequency transform using a wavelet as the polynomial for the transform, (2) computation of thresholds for each region generated by the wavelet-transform, and (3) a reduction of data below the calculated threshold. The wavelet, when optimally applied, produces a data set that pushes noise content into bins that generally fall below a threshold defined by correlated content that represents information of interest. The transfer function derived by the wavelet noise reduction process is used to optimize the initial wavelet function and also to predict an optimum threshold.

The time frequency transform using a wavelet as the polynomial for the transform applies a high-pass and low-pass filter where the coefficients are based on the chosen wavelet, as well as a windowed oscillating function that begins and ends with zero amplitude. The low-pass filtered output is from the first region of interest. The high-pass filtered output is again divided using the low-pass and high-pass filters (the total number of repetitions defined by the order of the wavelet transform). The filtered results may vary as a function of the chosen transfer function. For all cases, the transform separates the data into spectral regions called bands.

For each spectral region derived from the wavelet transform, the amplitude is separated into a histogram to determine the likely threshold between any potential signals of interest and the noise to be removed. By way of example, and not as a limitation, typical threshold algorithms may include Bayes, False Discovery Rate, Minimax Estimation, Stein's Unbiased Risk Estimate, and Universal Threshold.

The Empirical Bayes method uses a threshold rule based on assuming measurements have independent prior distributions given by a mixture model. Because measurements are used to estimate the weight in the mixture model, the method tends to work better with more samples. By default, the posterior median rule is used to measure risk.

The False Discovery Rate (FDR) method may use a threshold rule based on controlling the expected ratio of false positive detections to all positive detections. The FDR method works best with sparse data. Choosing a ratio, or Q-value, less than ½ yields an asymptotically minimax estimator.

The Minimax Estimation method uses a fixed threshold chosen to yield minimax performance for mean squared error against an ideal procedure. The minimax principle is used in statistics to design estimators.

The Stein's Unbiased Risk Estimate (SURE) method uses a threshold selection rule based on Stein's Unbiased Estimate of Risk, which is a quadratic loss function. Applying the SURE method provides an estimate of the risk for a particular threshold value (t). Minimizing the risks in (t) gives a selection of the threshold value.

The Universal Threshold method uses a fixed-form threshold yielding minimax performance multiplied by a small factor proportional to log(length(X)).

In applying these methods, the calculated threshold for wavelet band, the information below the threshold, may be set to zero.

After completion of the noise reduction process 110, a clean data set 122 may be provided to the object detection process 115. The object detection process 115 identifies information that has a high likelihood of containing signals of Interest 108. Several techniques may be used to perform the object detection process 115. By way of example, and not as a limitation, energy detection, correlation, and spectral analysis may be utilized independently of in combination.

This design of the antenna 127 and transforming process 105 described above may yield an improvement of over 25 dB versus a conventional single channel implementation of a HPOI receiver 100. Because of this improvement, a large number of signals may exhibit above the noise floor. The object detection process 115 may implement an energy detection algorithm to operate to identify these potential signals of interest 108. The energy detection algorithm may be implemented in an FPGA in series with the channel decimators implemented as part of the transforming process 105. Signals that straddle multiple channels may be reassembled after the energy detection process of the object detection process 115 is applied. Information identified by an energy detection process may be tagged with relative time and frequency for post-processing.

Signals of interest 108 are expected to have a higher correlation value versus random noise. Applying the correlation process to identify potential signals of interest 108 as part of the object detection process 115 is significantly more processor intensive than applying the energy detection method as part of the object detection process 115. However, utilizing the correlation process to detect signals of interest 108 may identify additional data streams that the energy detector process might miss.

The object detection process 115 may apply an FFT to the clean data set 122 output by the noise reduction process 100. The FFT may further divide the clean data set 122 into additional channels. A channel with only noise will result in a uniform distribution of energy over the analyzed spectrum. A potential signal of interest 108 may be identified using the spectral analysis method because the signal of interest 108 causes a change in energy over a set of frequency coefficients.

After potential signals of interest 108 are detected, they may be provided to the identification process 123 as one or more bounded data sets 124. The signal of interest 108 may be identified using the identification process 123. The identification process 123 may operate on the bounded data set 124 and may perform time-domain identification and time-frequency domain identification.

The bounded data set 124 provided to the identification process 123 may exist as a two-dimensional array in the time and frequency domain. To accommodate time-domain processing, the samples in the bounded data set 124 must be converted. In one embodiment, the conversion may be achieved by applying an inverse Fourier transform. The rectangle dimension in the frequency axis may be increased such that the width of the sample is a power of 2. An inverse Fourier transform may then be applied to the expanded bounded data set to return to a "time-domain only" signal.

Once converted to the time domain, the extracted information may be processed. By way of example, and not as a limitation, the identification process 123 may include burst analysis, detection, equalization, and demodulation in any combination.

The burst analysis process may evaluate the time-domain samples to identify the burst shape. The shape would differentiate the signal as to the source: radar, communications, emissions, noise, etc.

The detection process may search the time-domain samples looking for one or more preambles or mid-ambles that would be used by a receiver to calculate the frequency error and determine the beginning of the transmission burst.

The equalization process may search the time domain samples looking for a known reference that would be used to determine the characteristics that the signal saw as it passed through the time-space channel.

The demodulation process may operate by identifying the modulation method that was applied to the bounded data set 124.

In one embodiment, the identification process 123 may perform an initial identification with the FCN network to significantly simplify the time domain identification process 123 because the initial estimate of characteristics may already be known by the FCN network.

The identification process 123 applied to the bounded data set 124 provided by the object detection process 115 may use the FCN network to identify the signal of interest 108 thorough it's two-dimensional image properties. In effect, this implementation of the identification process 123 may leverage image identification technology to determine the likely signal characteristics.

The FCN network may identify signals of interest 108 by comparing the output of the convolution process implemented by the object detection process 115 to representations of signals either generated from simulation or captured from other emitters by virtue of the deep learning training where the processing paths, computational structures and scalar coefficients are instantiated.

A single FCN network configuration may process multiple bounded data sets 124 to identify signals of interest 108. However, this mechanism may yield a single confidence level of the overall signal assessment rather than an analysis of each individual bounded data set 124 provided to the identification process.

A system database 126 may be maintained and contain characteristics of known signal types. The classification process 128 may compare the known data types contained by the database 126 to the signal of interest 108 provided by the identification process 123. Signals of interest 108 that are deemed to match a known signal contained by the database 126 may be classified in accordance with known signal characteristics. Unknown signals that are determined to be unique, that is, not contained in the database 126 as a known signal, may both inform the user and/or be utilized to update the database.

The variables introduced by and inherently present in processing the data set 104 may produce imperfect metrics. The results of the resulting classification process 128 must be evaluated to produce a likely classification with a corresponding confidence factor.

To function at peak performance, the two-dimensional processing requires a priori knowledge of the characteristics of the original signal without noise, channel effect and distortion. However, since this system is evaluating unknown radiation sources, the characteristics of the original signal must be estimated, a process that is likely to produce errors and inaccuracies.

The derivation of signal estimates and other assumptions made may be constantly evaluated to adapt to the current environmental characteristics and update the calibration and training of the processes leading to the classification.

Different algorithms applied to the data sets may be measured against a set of assessment criteria to delineate the performance of the processes while maintaining the quality of the information for subsequent processing.

Quality metrics for each algorithm may be maintained and associated with the classified signals derived from the processed data to guide the evaluation of the identified signals.

These metrics may also be used to drive modifications and enhancements of the algorithms to improve future performance and optimize the algorithms used by the system.

In the inventive method, the two-dimensional time-frequency array 103 may be a spectrogram defined as a two-dimensional space specified by the amplitude of the signal in a bin defined by the relative time of the sample event and the portion of the overall bandwidth of the receiver after the frequency transform. In practice, this data configuration, the two-dimensional time-frequency array 103, can be treated as a monochromatic image. Processing methods and algorithms designed to operate on imagery may be utilized.

For each algorithm operating on the sampled data set, performance criteria may be applied based on an assessment algorithm that specifies the quantitative process to determine the resulting metric. Performance metrics may be passed in the metadata to inform the object detection process 115, identification process 123, and classification process 128. The derived confidence level of the result may be modulated as a result of the performance metrics.

The noise reduction process 110, object detection process 115, identification process 123, and classification process 128 may be applied to the two-dimensional time-frequency array 103 and utilized to assess performance metrics.

The noise reduction process 110 may seek to eliminate uniform and sporadic noise from the two-dimensional time-frequency array 103 such that signals of interest 108 are more readily discerned. The noise reduction algorithms implemented by the noise reduction process 110 may divide the information in the two-dimensional time-frequency array 103 by applying high-pass and low-pass filters to the array, thereby separating the information by frequency content. A threshold algorithm may be applied to each portion of the frequency spectrum such that noise is separated and subsequently removed from the original array.

Such an implementation of the noise reduction process 110 may reduce the original detail found in the samples from which the two-dimensional time-frequency array 103 was derived. The output of the noise reduction process 110, the clean data set 122, may be used to improve the performance of the object detection process 115. The two-dimensional time-frequency array 103 or initial data set 104 may be used for the identification process 123 and classification process 128.

The object detection process 115 may seek to identify and bound the portions of the clean data set 122 that hold signals of interest 108, resulting in a significant data reduction. The result of an object detection process 115 may be a set of "bounding boxes" that surround and, preferably, wholly enclose the relevant information contained in the two-dimensional time-frequency array 103. Best performance may be achieved when the bounding box completely encloses only the samples to be analyzed and no additional samples are included in the bounding box. However, in practice the object detection process 115 may add samples beyond the calculated bounding box to ensure that all relevant information about the detected signal is captured. The additional information included in the bounding box may improve the identification process 123 and classification process 128 without adding a significant number of additional samples to be processed The object detection process 115 may divide the clean data set 122 into a histogram based on the amplitude of the samples. The histogram may be analyzed to separate the signals of interest 108 from the remaining noise and background that was not removed by earlier noise reduction process 110 and transforming process 105.

The identification process 123 may initially characterize the bounded data set 124 by its communications criteria. The identification algorithms implemented by the identification process 123 may evaluate bandwidth, center frequency, modulation, and preamble characteristics to divide the bounded data set 124 into bins. Because each classification algorithm implemented by the classification process 128 may be unique to a specific type of signal, data sets in each bin may be separately assessed by the classification algorithms of the classification process 128 after identification.

The classification algorithms of the classification process 128 may be designed to discern the specific type of signal contained in the signal of interest 108. This may be done by comparing the metrics derived from the noise reduction process 110, object detection process 115, and identification process 123 to known signals in a database 126. Signals may be identified based on similarity to one or more known entries in the database 126 and may be classified according to the match. The identification and classification may be assessed a confidence level based on the differences between the signal of interest 108 and the known signals contained in the database 126.

In the event a bounded data set 124 is identified as a signal of interest 108, but does not meet the criteria for classification as a known signal, the data set may be grouped in the "unknown signal" category and reported to the user along with the signal characteristics that were derived during the identification process 123.

Further analysis of "unknown signals" may result in updates to known signals contained in the database 126.

Assessment criteria of these processes may fall into the two areas of (1) performance criteria and (2) signal quality criteria. Performance criteria is directed to maximizing performance and efficiency of the process. Signal quality criteria is directed to preserving the quality of the signal of interest yet to be discerned. Each algorithm implemented by the system must balance the achievement of the first metric, performance, against the degradation in signal quality, the second metric. By way of example, and not as a limitation, an algorithm that is designed to remove noise must not damage the underlying signal of interest 108 to the point where it can no longer be detected, identified, and classified. An algorithm designed to identify signals of interest 108 may be preferred to identify all potential signals of interest 108 and not include artifacts that are not signals of interest 108. An algorithm implemented by the classification process 128 and designed to classify signals may be preferred to not misclassify a signal of interest 108.

The efficacy of processes that seek to reduce the size of the data set for further processing may be measured by various criteria. Some of these criteria may be specific to a particular process and others may apply to multiple or all processes that optimize the data for further processing.

One criteria to determine efficacy may include applying the covariance function to the results of the process. The covariance function will resolve to a unit impulse at the center of a data set when the data set is comprised entirely of random noise. This is because the correlation result will only peak at the center of data set where it perfectly aligns with itself. When the covariance function is applied to a data set and one or more peaks, other than a peak at the center of the data set, resolve in the data set, these peaks are indicators that the data set to which the covariance function was applied is not random noise.

Applying the covariance function to a data set allows the user to assess a set of samples to determine the nature of the noise content of those samples. To accurately determine the noise spectral density function, a sample set to be analyzed must be composed primarily of noise.

Applying the covariance function to a data set also allows the user to assess a set of samples to determine if there are potential signals of interest contained within the data set. Signals of interest will auto-correlate to a higher value than random noise.

The covariance function may also allow the user to assess a set of samples to determine the performance of a noise processing algorithm. A reduction in noise power will generally lower the covariance value.

The covariance function is specified as:

$$A(x, y) = \frac{1}{\text{Var}(f)} \sum_{l=0}^{L-1} \sum_{m=0}^{M-1} f(l, m) f(l - x, m - y)$$

where:
  f[l,m] represents the source array
  A[x,y] represents the result array
  Peak Signal to Noise Ratio (PSNR) is the ratio of the maximum possible signal power to the power of distorting noise. Any noise reduction process applied to the original data set will seek to maximize the ratio.

The equation that defines PSNR is specified as:

$$PSNR = 20\log_{10}\left(\frac{S_{peak}}{\sqrt{N_{mse}}}\right)$$

where:
  $S_{peak}$ is the maximum signal power
  $N_{mse}$ is the average noise power
and Mean Squared Error of a two-dimensional array is defined as:

$$X_{mse} = \frac{1}{MN} \sum_{m=0}^{M-1} \sum_{n=0}^{N-1} \|f(m, n) - g(m, n)\|^2$$

where:
  f represents the matrix of the original array
  g represents the matrix of the degraded array
  M represents the numbers of rows of the array
    m represents the index of that row
  N represents the number of columns of the array
    n represents the index of that column
  Signal to Noise Ratio (SNR) is the measure of average signal power to average noise power. Any noise reduction process applied to the original data set will seek to maximize the ratio.

The equation that defines SNR is specified as:

$$SNR = 20\log_{10}\left(\frac{\sqrt{S_{mse}}}{\sqrt{N_{mse}}}\right)$$

where:
S$_{mse}$ is the average signal power
N$_{mse}$ is the average noise power The noise spectral density is the noise power as a function of frequency within a given channel. Noise Spectral Density is a combination of thermal noise, quantization noise (as this is a sampled system), clock jitter, and semiconductor noise. This measurement analyzes the effect of processing on the distribution of noise over frequency.

To calculate this, a portion of the data stream that contains primarily noise is identified. Then, the two-dimensional discrete transform of this noise data will be computed to determine the noise distribution. Using this distribution, the total noise power will be computed by applying the distribution over the total array.

The equation that defines Noise Spectral Density as a function of frequency is specified as:

$$N(x, y) = \frac{1}{\sqrt{LM}} \sum_{l=0}^{L-1} \sum_{m=0}^{M-1} n[l, m] e^{-j2\pi\left(\frac{lx}{L} + \frac{my}{M}\right)}$$

where:
n[l,m] represents the matrix of the source array
N(x,y) represents the matrix of the noise spectral density The data reduction ratio is the ratio of the number of samples before data reduction to the number of samples after the reduction process. Assuming the data reduction process inserts zeros in a sample that is deemed to be insignificant, the data reduction ratio is specified as:

$$R = \frac{\left(\sum_{l=0}^{L-1} \sum_{m=0}^{M-1} Y(l, m)\right)}{\left(\sum_{l=0}^{L-1} \sum_{m=0}^{M-1} X(l, m)\right)}$$

where:
X[l,m] represents the matrix of the source array
Y[l,m] represents the matrix of the destination array For a given covariance output, the covariance standard deviation is a measure of the randomness of the result. For a completely random data set, the standard deviation will be close to the average of the result. The standard deviation will increase for a higher distribution of noise power. Once the noise reduction algorithm of the noise reduction process 110 has been applied, the standard deviation will decrease when compared to the data set prior to the application of noise reduction.

$$STD = \sqrt{\frac{1}{LM} \sum_{l=0}^{L-1} \sum_{m=0}^{M-1} \left(A(l, m) - \overline{A}\right)^2}$$

where:
A[l,m] represents the covariance array

Discontinuities in the time domain may add a uniform layer of noise to the data set. Signals of interest 108 will, in general, not exhibit discontinuities. Improper detection processes may cut off portions of the relevant information resulting in a discontinuity. Evidence of the discontinuity may be discerned by measuring the signal to noise ratio of the bounded data set 124 after data reduction processes are applied to the data set. The signal to noise ratio of the data set after noise reduction may be compared to the signal to noise ratio of the data set prior to reduction to identify a discontinuity.

One could also measure the noise spectral density before and after data reduction to discern any changes in the mean noise level over the spectrum of interest, which may indicate a discontinuity.

Signal quality criteria may define the characteristics of the signal of interest 108 that must be preserved such that the identification process 123 and classification process 128 can return high confidence levels for known signals. If the process applied to reduce the data set causes significant damage to the remaining data, the resulting signal may be assessed as unknown or potentially assessed, identified, or characterized incorrectly.

To facilitate the signal quality analyses described below, the bounded data set 124, which is expected to contain a signal of interest 108, may first be converted to a time-domain series representing the original transmitted information. If the bounded data set 124 is spread over multiple channels, a frequency to time process may be utilized to combine the information from multiple bins into a single data set. Subsequent analysis of the potential signal of interest may be performed on this time-domain representation contained in the single data set.

Very few signals encountered by an analysis system will expose the center carrier frequency. In general, the carrier is not required to demodulate the source and it requires power to transmit while offering no significant benefit to the receiver. However, most transmitted signals are symmetric across the fundamental transmission spectrum as defined by 90% of the transmitted energy. A frequency deviation analysis may be performed to determine or verify the center carrier frequency. A properly detected signal will exhibit a median and mean at the center of the transmitted spectrum when computed over a time period that reasonably encompasses enough data to represent a uniform distribution.

This analysis to determine the transmitted spectrum may be performed by computing the fast Fourier transform (FFT) of the time-domain data set. The mean and median may be computed on the frequency coefficients produced by the FFT. A deviation between the mean and the median may indicate that the object detection process 115 has left out relevant portions of the spectrum.

A bandwidth deviation analysis may assess the bandwidth of the signal of interest 108 in the frequency domain after detection. The bandwidth deviation analysis may use the output of the FFT described above to evaluate the power spectral density of the signal of interest 108 and assess this against the expected bandwidth deviation.

The spectral density of the main lobe of signal energy (defined as 90% of the total energy of the signal of interest 108) may be computed and compared to the density in twice the bandwidth of the main lobe. The spectral density may be assessed by looking at symmetry, energy distribution, and shape. A modulated signal is assumed to be symmetric about the center frequency. A modulated signal has a known energy distribution across the spectrum, which is unique to the signal type. Each modulation type creates a shape of the power spectral density function, which is unique to the modulation type.

Some signal transmission methods may strive to randomize the information that is transmitted. An inter-leaver may be applied to the data set prior to transmission to distribute bits uniformly over the spectrum in an attempt to minimize sequential bit errors that are more likely to be affected by fading. However, for a communication signal to be properly detected, there must be portions of the transmission that yield a high level of correlation. To optimize the identification process 123 and classification process 128, performance algorithms must not degrade or eliminate these portions of the transmission.

Unlike the covariance distribution process, which may be performed on the clean data set 122 by the object detection process 115 to discern likely locations of signals of interest 108, performance analysis related to the identification process 123 and the classification process 128 may be performed on the time-domain extracted data containing the signal of interest 108. The reason for this may be to facilitate discernment of the structure of the signal.

As depicted in FIG. 1, the inventive system 100 may utilize a high-performance analog to digital converter 102 to perform the initial conversion of the wide band spectrum data set 104 to be analyzed. The initial data set 104 will be divided by down-converting to a sub-channel frequency, applying a bandpass filter to the samples and decimating to a clock rate that is consistent with the resulting bandwidth of the channel.

There may be multiple sub-channels resulting from the down-conversion decimation process and the bandwidth/clock rate of the sub-channels may be such that they can be further divided using digital methods in the fabric of a field programmable gate array (FPGA). In one embodiment, digital processing will yield a minimum of 256 individual sub-channels.

The time-aligned outputs of the digital channelizer may form a two-dimensional array with time in one axis and the center frequency of the sub-channels in the other axis, this may be referred to as a two-dimensional time-frequency array 103. Each bin may represent the energy at that time and frequency over the bandwidth of the bin.

The initial sample clock rate may be divided by the number of channels because the bandwidth of the individual channel can be captured by a lower clock rate. However, the overall data rate of the system does not change as there may be 256 (or more) samples for each interval of time.

A set of noise reduction and background removal algorithms may be implemented by a noise reduction process 110 to improve the contrast ratio of the potential signals of interest 108.

The noise reduction algorithms of the noise reduction process 110 may be applied using a very aggressive removal mechanism. Aggressive removal may be appropriate because the goal of detection is to locate and separate any information that may represent signals of interest 108 from the larger data set.

In one embodiment, the noise reduction process 110 may include a wavelet-based noise reduction system with dynamic thresholding as this implementation has demonstrated the highest performance removing noise and background while retaining the original content. In this phase of the process, the parameters defining the wavelet process may be predetermined for all data sets as the goal of the process is increased contrast. The quality of the remaining samples that define the signal of interest 108 may be sufficient for the object detection process 115, which may be applied later in the method.

During the post-processing of the signals of interest 108, a second noise reduction process may be applied. The second noise reduction process may be tailored to the content with the goal of retaining the details of the potential signal.

Other background information and interference artifacts may be identified in the two-dimensional time-frequency array 103 and removed to prevent corruption of the subsequent thresholding processes.

The noise reduction process 110 is primarily concerned with separating signals of interest 108 from the background signal. The noise reduction process 110 may implement a contrast enhancement process to remove noise, interferers and fixed background information from the two-dimensional time-frequency array 103. The object detection process 115 may receive this clean data set 122 from the noise reduction process 110 and identify any remaining information, which satisfies the dynamic thresholding processes. This remaining information may be separated from the larger data set and provided to the identification process 123 as a bounded data set 124. The contrast enhancement process implemented by the noise reduction process 110 may apply aggressive techniques to isolate signals of interest 108 and may not be concerned with retainment of signal quality.

Following the contrast enhancement process implemented by the noise reduction process 110, an object detection process may be applied to the clean data set 122 to extract a set of samples that are likely to contain a signal of interest 108. The object detection processing method may identify an area of interest and draw a "bounding box" around the area. The object detection process 115 may include mechanisms to ensure that there is sufficient margin around the proposed signal of interest 108.

After the noise reduction process 110 is applied to the two-dimensional time-frequency array 103, the power levels of the signal of interest 108 remaining in the bounded data set 124 may vary over orders of magnitude with some signals residing just above the floor composed of noise and background information that was not removed. The information lying just above the remaining noise is potentially of significant interest as it may be deliberately obfuscated from conventional intelligence systems.

A wavelet noise reduction process may be applied previous to the object detection process 115 implementing an algorithm to compute thresholds for each transform region as part of the noise reduction process 110. These thresholds may be retained for data separation as they were calculated to separate the noise from potential signal of interest 108.

The two-dimensional time-frequency array 103 may be further divided into bins based on the amplitude distribution of the two-dimensional time-frequency array 103. The two-dimensional time-frequency array 103 resulting from dividing the spectrogram data into amplitude bins may be evaluated using multiple methods to determine likely thresholds. This may be considered an aggressive noise reduction process and the process may remove some of the high frequency information from the two-dimensional time-frequency array 103, effectively implementing a low-pass filter on the original two-dimensional time-frequency array 103. The histogram threshold processes rely on this prefiltering to remove the discontinuities in the clean data set 122 provided to the object detection process 115. These mechanisms may include:

Histogram Minima Thresholds—This method may compute the first and second gradients of the histogram to identify the lowest intensity valley or plateau, choosing that valley or plateau value as the threshold point below which data is considered noise Otsu's Threshold—This method may process the histogram and segment the data sets of interest by minimization of the variance on each of the classes. A set of classes may be developed to provide a baseline for the process.

Neural Network Derived Threshold—The two-dimensional time-frequency array 103 provided to the histogram threshold process resembles a grayscale image. A network designed to identify objects in an image may take advantage of this and be adapted and trained to identify signals of interest.

Using the thresholds derived in the histogram threshold process described above, the signal of interest 108 may begin the post-processing step, implemented by the object detection process 115. In the object detection process 115, the two-dimensional time-frequency array 103 may be divided into two levels, one above and one below the threshold determined by the noise reduction process 110. The data included in the data set above the threshold may be statistically assessed to determine the total number of samples in the signal and may be included in the clean data set 122. The bounding box determined by the object detection process 115 may then be expanded to include roughly twice the number of samples identified by the computed threshold. This method assures that all of the relevant data is kept for further evaluation.

The adjusted bounding borders may be assessed to determine the bounding box to be applied to the two-dimensional time-frequency array 103 that encloses the signal of interest 108. The samples enclosed by the bounding box are extracted, referred to as a bounded data set 124, and labeled to identify the time and center frequency of the bounded data set 124.

Processing of the bounded data set 124 may be performed in both the time and the frequency domain.

The bounded data set 124 exists as a two-dimensional array in the time and frequency domain. To accommodate time-domain processing, the samples must be converted from the time-frequency domain to the time-domain only. The rectangle dimension of the bounding box in the frequency axis may be increased such that the width is a power of 2. An inverse Fourier transform may then be applied to the bounded data set 124 included in the enlarged bounding box, which returns the data set to a "time-domain only" signal.

Noise reduction processes may be applied to bounded data sets 124 in both the time-frequency domain and the time-domain. The noise reduction process may be tailored to retain as much of the details defining the signal of interest as possible.

The object detection process 115 may estimate the location of signals of interest 108 within the clean data set 122 and define a bounding box around the two-dimensional time-frequency array 103, isolating the signals of interest 108 within the bounding box. Further processes may extract the signals of interest 108 from the two-dimensional time-frequency array 103 and produce two annotated potential signals of interest 108, one in the time/frequency domain and the other in the time-domain only. The bounded data sets 124 may be processed by a noise reduction process designed to operate on the smaller, confined information contained within the bounding box.

A properly operating process will find all the potential signals of interest 108, include just enough samples to properly identify and classify the signals of interest 108, and remove the background noise.

After extraction and post-processing, the properties of the signals of interest 108 may be readily determined. The following parameters may be evaluated to determine the performance of the object detection process:

Discontinuities—Discontinuities may arise when the detection process has failed to include all the information that defines the signal of interest. If discontinuities are present, they may cause an increase in bandwidth without an increase in information.

Structure—Detected signals should have a defined structure with a well-defined beginning and end.

Covariance Standard deviation—The covariance standard deviation value assesses the randomness of the captured data. A signal of interest may have characteristics that differentiate from noise or random content. Note that some communications systems deliberately randomize the transmission to prevent detection.

Identification is the process by which a set of samples believed to be a signal of interest are converted into a data set that describes the information in the form of the signal characteristics. By way of example, and not as a limitation, these characteristics may include the following:

Center Frequency—The selected transmission frequency

Bandwidth—the spectrum occupied by 90% of the power spectral density

Modulation Type—That parameter translated by the applied data

Burst Length—The time from the beginning to the end of the transmission

The time domain identification process uses the time-domain extracted data set and processes the signal as if the process was a receiver. Analysis for identification may include:

Burst Analysis— A burst analysis process may evaluate the time-domain samples to identify the burst shape. The burst shape may differentiate the signal as to the source, such as, by way of example, and not as a limitation, radar, communications, emissions, noise, or the like Detection—The detection process may search the time-domain samples to identify preambles or mid-ambles that may be used by a receiver to calculate the frequency error and determine the beginning of the transmission burst Equalization—The equalization process may search the time domain samples to identify a known reference that would be used to determine the characteristics that the signal experienced as it passed through the time-space channel Demodulation—The demodulation process may attempt to identify the modulation method For best performance, a system that performs an initial identification with the neural network may significantly simplify the time domain identification process as the initial estimate of characteristics are already known.

The process of identifying signals with a neural network may operate on the time/frequency domain extracted data set and use the Fully Convolutional Network (FCN) to identify the signal thorough its two-dimensional image properties. In effect, process of identifying signals with a neural network may leverage image identification technology to determine the likely signal characteristics. The neural network may identify signals of interest by comparing the output of the convolution process to representations of signals either generated from simulation or captured from other emitters by virtue of the deep learning training where the processing paths, computational structures and scalar coefficients are instantiated. A single neural network configuration may process multiple signals of interest. However, this mechanism will yield a single confidence assessment of the overall signal assessment rather than an analysis of each individual criteria provided by the Time-Domain Identification.

The identification process may convert the extracted signal of interest into a set of characteristics. Using the characteristics derived from the extracted data, the Signal Quality Assessment criteria may be applied to the signal based on the understanding of how the signal should behave.

The classification process 128 may compare the characteristics of the identified signal derived during the identification process to a database of stored signals, also described using the same parameters, to determine if there is a match. The comparison process is statistical and may produce weights for each parameter assessed. Assessment of the Classification Process may evaluate the resulting weights for each parameter to determine root cause for low confidence.

The classification processes 128 may derive the characteristics that uniquely describe the signal and differentiate it from the other signals. These characteristics may then be compared against the characteristics of known signals stored in a database developed specifically for the purpose of classification. However, it is unlikely that the derived signal characteristics will match the database exactly. The difference between the derived signal characteristics and the known signal characteristics may determine the confidence level of the comparison for each characteristic. An overall confidence level may be a function of the individual confidence levels for each of the classification metrics used to match the signal with its database entry.

In a properly trained and calibrated system, any detected and identified signal of interest would match up with a corresponding known entry in the database. However, it is unlikely that any system, regardless of how it is configured, will produce a 100% level of accuracy. There may be signals that result in a less than optimum classification. In order to properly determine the need to update the calibration or training of the system, one must first determine the source of any poor confidence assessment. It should be noted that a poor confidence assessment is not necessarily a poor assessment of the processes used. A root cause analysis may be initiated to determine the cause of a poor confidence assessment.

Environmental effects may result in damage to the signal of interest such that the identification and classification algorithm may not yield an acceptable result. Some possible environmental effects that would result in a poor confidence assessment include, by way of example, and not as a limitation:

Poor Signal to Noise Ratio— A signal significantly affected by the channel characteristic due to propagation loss will exhibit a poor signal to noise ratio. The processes used to remove thermal noise from the system may not likely improve signal to noise ratio as the information needed to properly classify the signal may be destroyed Fading and Multipath—Fading and multipath may produce amplitude variations in the time domain that are inconsistent with the expected waveform. The standard deviation of the average signal power may show significant energy past the one sigma mark.

Interference—if multiple signals occupy the same time-space channel, enough information may be destroyed to prevent meaningful identification.

While these effects may produce a poor confidence assessment, none of these effects necessitate an update to the calibration or training of the algorithms.

Outside of environmental effects that damage the signal and result in a poor identification and classification, the system may have detected a signal that does not have a counterpart in the database. If some, or all, of the identification criteria yield high confidence but there was a poor overall match, this signal may be classified as "unknown." Subsequent post-analysis evaluation may identify the signal and result in an update to the database.

If the confidence analysis fails to identify a root cause attributable to environmental effects or classification failure, a signal quality assessment may call for an update to the calibration, training or algorithm baseline to improve the performance of the system. The assessment may evaluate the performance criteria to determine if any of the processes applied to the data set resulted in the poor database match or confidence level. In particular, degradation may be the result of:

Loss of Information—The noise reduction process relies on an accurate estimate of the original transfer function of the signal of interest. This estimate may be affected by the characteristics of the noise that is part of the information represented by the samples. A typical result of an incorrect noise reduction process is the loss of high-frequency information.

Poor Detection Process—The goal of the detection process is the identification of samples that represent a signal of interest. To ensure that information is not lost, the "bounding box" algorithm may be calibrated to include additional samples beyond those needed. However, it is possible that the characteristics of the signal make it difficult to identify the boundaries of the samples. Specifically, spread spectrum algorithms may be difficult to discern.

Multiple Likely Matches—the identification data may match multiple entries in the database such that the confidence level is driven not by the poor quality of the data rather the inability to discern the correct match.

In one embodiment, the receiver may have an RF front end. The RF Front End may provide the impedance matched input for the antenna 127 connection, gain to amplify the incoming RF signal, which may contain signals of interest 108, up to the level required by the analog to digital converters 117, a multiplexer to split the spectrum and impedance matched interfaces to the analog inputs of an RFSOC device.

The additional noise applied to the incoming signal due to the characteristics of the gain, attenuation, and filtering stages of the circuit may be referred to as the noise figure of the RF Front End. The goal of the RF front end design is to implement sufficient gain in the first stage such that the noise contributions of the subsequent stages do not significantly contribute to the overall noise contribution of the system. This RF front end design concept is referred as "setting the noise figure" when the first gain stage meets this requirement. Because of the wide bandwidth, which extends well into C band, the initial gain stage will have to accommodate this bandwidth. RF front ends with this capability are expected to yield a noise figure of 3 dB at maximum overall gain.

The gain requirement of the RF front end is based on the number of spectrum divisions applied to the signal and the expected performance of the analog to digital converters 117. Specifically, sufficient gain should be applied to capture the expected noise level at the input to the converter with enough margin above the spurious free dynamic range (SFDR) to resolve any signals that might appear once the spectrum is further divided.

It is expected that there will be some variation in the gain performance from one system to the next, even when designed identically. To address this variation and provide a capability to calibrate systems to provide largely similar performance, an attenuator may be installed in the gain path to adjust the overall input gain to the analog to digital converters 117. To account for the attenuator losses, there may be additional gain in the RF front end.

The RF front end may provide signals to a radio frequency system on chip (RFSOC). In one embodiment, the particular RFSOC implementation may include a Radio Frequency System on Chip (RFSOC) device from Xilinx that is part of a family of Ultrascale+devices offering high-integration and high-density high-performance FPGA fabric. The RFSOC may include a set of wide-band analog to digital converters 117 integrated with a down converter 119 decimator on an RF Tile. Although the analog to digital converters 117 may offer a sample clock of up to 5 giga-samples per second, the FPGA fabric may not be capable of handling that data rate. In such an embodiment, the down converter 119 decimator paired with the analog to digital converter 117 may reduce the bandwidth of the channel and the associated sample clock to a rate that the FPGA fabric can handle.

Performance of the system may hinge heavily on the design of the analog to digital converter 117. An analog to digital converter 117 operating at very high sample clocks is expected to draw more power and exhibit less SFDR. In one embodiment, these issues may be compensated for with a smaller geometry of the RFSOC.

To capture spectrum up to four gigahertz, the sampling system operation ahead of the analog to digital converters 117 may have a bandwidth in excess of four gigahertz. The analog to digital converters 117 may process spectrum at up to twice the sample clock.

The digital HPOI Receiver may not utilize automatic gain control. The gain may be fixed such that the expected noise floor for each of the channels is at the SFDR of the analog to digital converters 117. For one embodiment of the receiver, the expected dynamic range may be 80 dB.

The down-converter 119 and decimator may multiply the sampled spectrum to baseband and produce a complex output (in-phase (I) and quadrature-phase (Q) outputs). In one embodiment, the decimator may support clock division up to a divide by 10. The samples output by the decimator may interface with the FPGA fabric at the full data rate of the decimator.

In embodiments in which an FPGA is utilized, the FPGA fabric may receive samples from the decimator of the RF Tile and support a 16-point frequency transform at the full clock rate. The FPGA fabric may have hard cores for signal processing and memory and shall be of sufficient size to process a 512 by 512 spectrogram, which may produce to up to 16 signals of interest 108.

The system may include a graphics processing unit (GPU) with sufficient performance to process up to sixteen (16) signals of interest 108 derived from each 512 by 512 spectrogram. The GPU may implement an FCN network trained to identify the signals of interest 108 consistent with the requirements of the classification process 128.

The system may include a general purpose processor. In one embodiment, the general purpose processor may run the Linux operating system and support the classification process 128 and display software.

Clock implementation and distribution may drive design complexity depending on the implemented conversion approach. To fully capture all of the bandwidth of the incoming RF signal, the channels must support a guard band as required by the decimation filters. Assuming 80% of the sampled bandwidth is available, the sample clocks shall be selected to support decimation rates of 4, 5, 6 and 8.

Clock drift and error may set the baseline for all subsequent calculations. Clock performance is measured as phase noise and jitter, which directly drives noise performance and resolution. In one embodiment, the reference clock must support at least a total error of less than 1 part per million. Because the clock must be distributed to multiple analog to digital converters 117, the buffering mechanism must minimize clock skew.

The RF interface between the antenna 127 and the analog to digital converters 117, which is referred to as the RF front end, must provide sufficient gain ensure that the first gain stage sets the noise figure for the entire system. To ensure maximum dynamic range, there must be sufficient gain to amplify the incoming signal such that the expected thermal noise floor is at the same level as the SFDR of the analog to digital converters 117.

In one embodiment, the front-end amplifier may be either Analog Device HMC8410 or HMC8411 or an amplifier with a typical performance as shown in FIGS. 3 and 4. The front end amplifier must cover the entire band and offer relatively flat gain and a noise figure less than 2 dB. The front end amplifiers may be cascaded for higher gain. If a bypassable front end amplifier is desired, the Analog Devices ADL8111 may be utilized, however the noise figure of this device approaches 3 dB.

The maximum RF input level of the RF front end amplifier may be 20 dBm. If a limiter is required to protect the LNA from energy higher than 20 dBm, or the value of the maximum RF input level of the front end amplifier, the Mini-Circuits CLM-83-2W+ or the Skyworks SKY16603-632LF may be utilized.

A Qorvo QPC6713 may be utilized as an attenuator. In embodiments in which a parallel interface is desirable, the RFSA3714 may be utilized as an attenuator.

To take advantage of the multi-channel configuration of the RFSOC, the broadband input may initially divided into subchannels using dividers.

Important parameters of the dividers to consider are bandwidth, insertion loss, and isolation. The broadest bandwidth divider is a resistive divider, and the insertion loss for a 2-way split is 6 dB, but the isolation is only 6 dB. Higher isolation may be available from a transformer-based divider or a Wilkinson type divider, but these types of dividers may not cover the entire desired bandwidth. Transformer dividers operate well at lower frequencies, and the Wilkinson dividers are better suited for higher frequencies because they become very large at low frequencies. In embodiments in which a diplexer or multiplexer is incorporated into the divider circuitry, a combination of transformer and Wilkinson dividers may be utilized.

Figure 6:
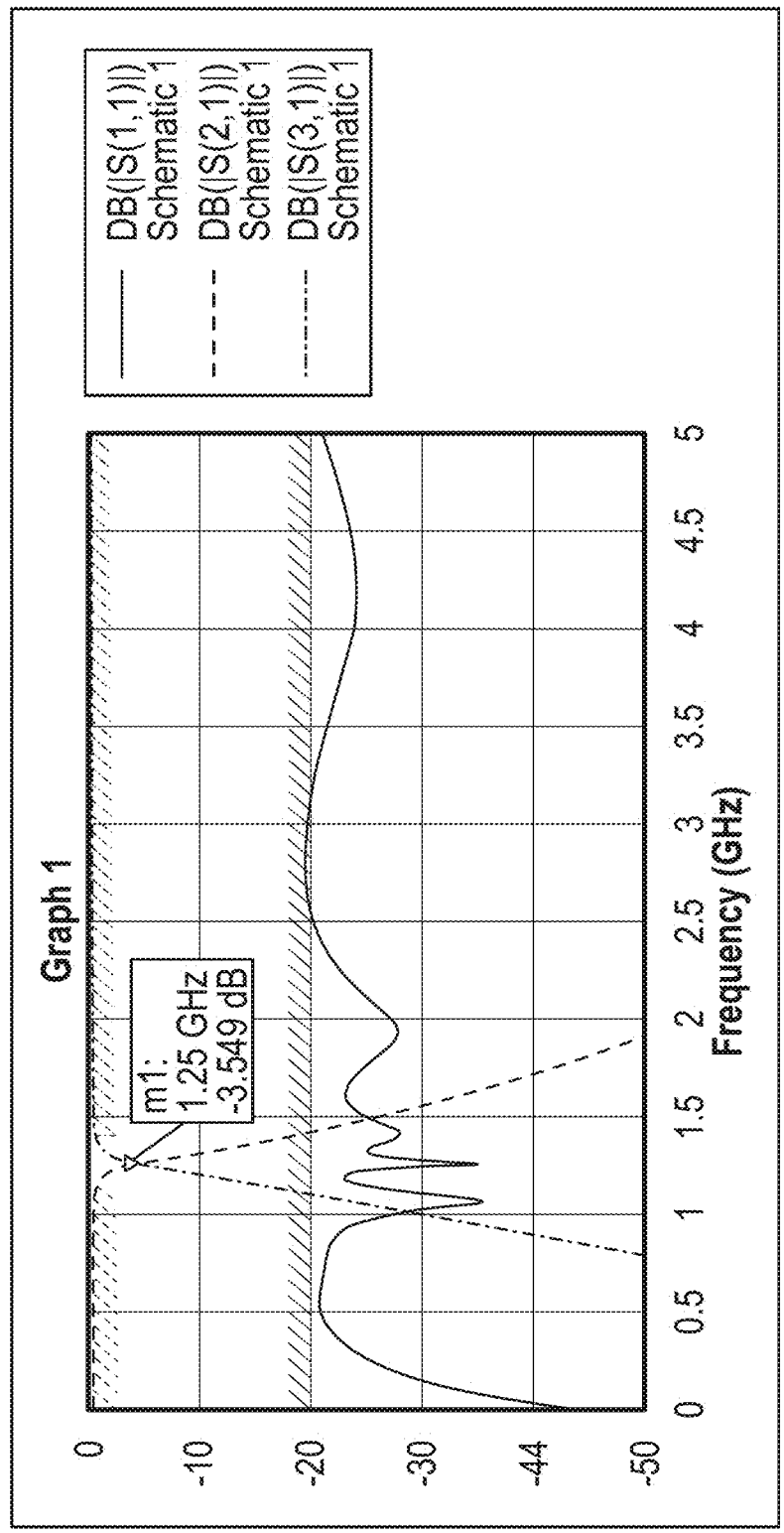
FIG. 6 is a graph of the performance of the diplexer deign of FIG. 5.

An embodiment of a possible diplexer schematic is depicted in FIG. 5, and the expected insertion and return loss performance of that diplexer design is depicted in FIG. 6. The diplexer depicted in FIG. 5 is a 7th-order diplexer and is designed for a crossover frequency of 1.25 GHz using commonly available capacitors and inductors.

In one embodiment, a low frequency power divider may be implemented by the Mini-Circuits TCP-2-272+, which has an operational bandwidth of 5-2700 MHz, and the typical performance data is shown in FIG. 7. By way of example, and not as a limitation, other low frequency power divider options may include Mini-Circuits SYPS-2-252+ and TCP-2-33W+.

In one embodiment, a high frequency power divider option may be implemented by the Mini-Circuits EP2W1+, which has an operational bandwidth of 500-9500 MHz, and the typical performance data is shown in FIG. 8. By way of example, and not as a limitation, other high frequency options may include the Mini-Circuits EP2W+ and SEPS-2-63+.

In embodiments in which higher isolation is required, the Marki Microwave may be utilized. The Marki Microwave offers a "high isolation" divider (part number PBR-0006SMG) with 35 dB of isolation, however the insertion loss of this divider can be as high as 9 dB.

Narda, RF-Lambda and SigaTek offer connectorized power dividers with up to an 8-way divide. These options have a low frequency cut-off of 500-700 MHz, and the part numbers are Narda 4436-2 (4436-3, 4436-4, 4436-8), RF-Lambda RFLT8W0006G and Siga Tek SP54857.

Figure 9:
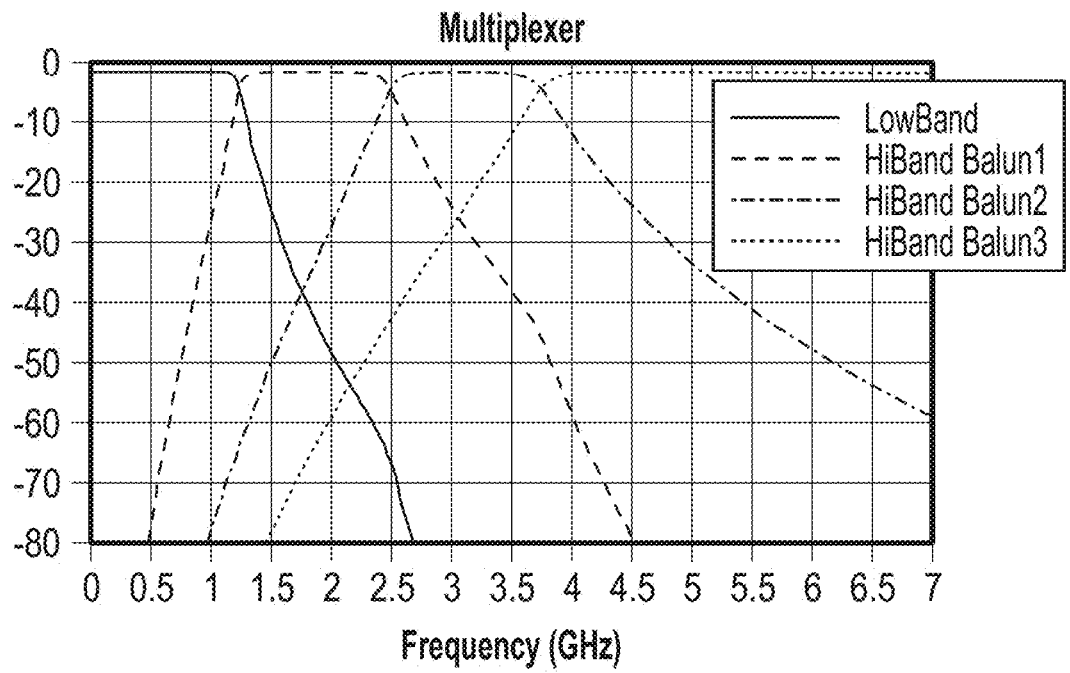
FIG. 9 is a graph of the frequency response of a multiplexer according to an embodiment of the present invention.

A multiplexer may be utilized to divide the spectrum into more than two bands. A triplexer may be utilized to divide the spectrum into three band and a quadplexer may be utilized to divide the spectrum into four band. In one embodiment, a quadplexer may be utilized because channelization is implemented into a power of two. In one embodiment, the quadplexer may be implemented with ideal lumped components, and each filter section may be 7th-order. The expected frequency response of such an implementation is depicted in FIG. 9.

In one embodiment, Telonic Berkeley quadplexer may be utilized. The approximate size of such a quadplexer may be 3.0"×2.0"×0.75". In one embodiment, the quadplexer may provide a 1.5 dB max insertion loss within 80% of each band, and 5.5 dB max at the crossovers. The minimum return loss may occur at or near 12 dB.

In one embodiment, 2 diplexers instead of a single multiplexer may be utilized. An undesirable aspect of a multiplexer is the high losses associated with each cross-over. As previously mentioned, a desired diplexer may have a maximum loss of 5.5 dB at the cross-overs. In an implementation utilizing 2 diplexers these cross-over losses are eliminated, but additional filtering will be required to define the band edges. Some overlap of the band edges will occur, so the noise bandwidth is increased approximately 0.5 dB, with the exact increase in noise bandwidth increase depending on the amount of overlap.

Figure 10:
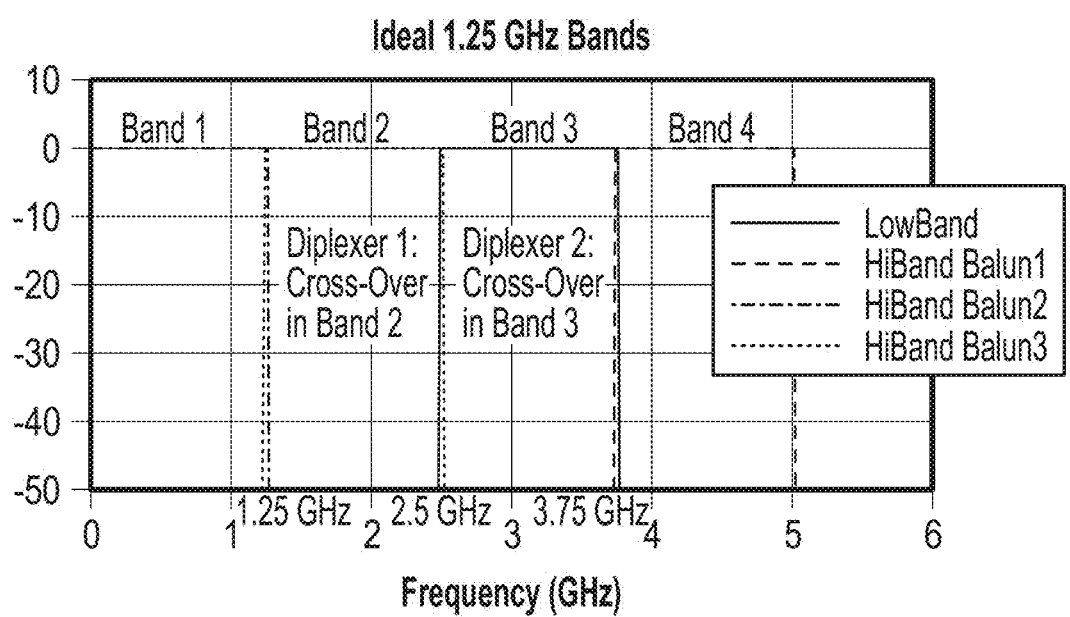
FIG. 10 is a graph of the frequency response of two diplexers according to an embodiment of the present invention.

FIG. 10 depicts the frequency response 4 ideal 1.25 GHz bands with minimal overlap. The locations of the diplexers are shown in FIG. 10. As depicted in FIG. 10, the outputs of diplexer 1 supports Band 1 and Band 3, and the outputs of diplexer 2 supports Band 2 and Band 4. Careful consideration of the diplexer cross-over locations reduces the number of additional filters required to define the band edges.

Figure 11:
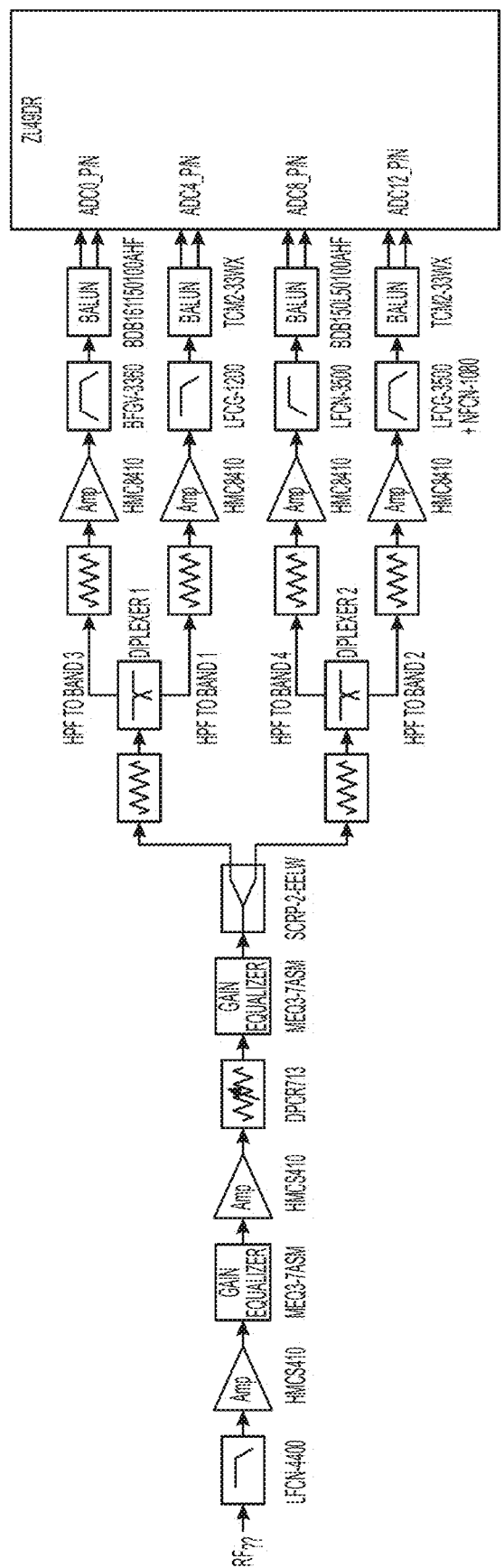
FIG. 11 is a schematic of the RF front end in combination with the RFSOC, according to an embodiment of the invention.
Figure 12:
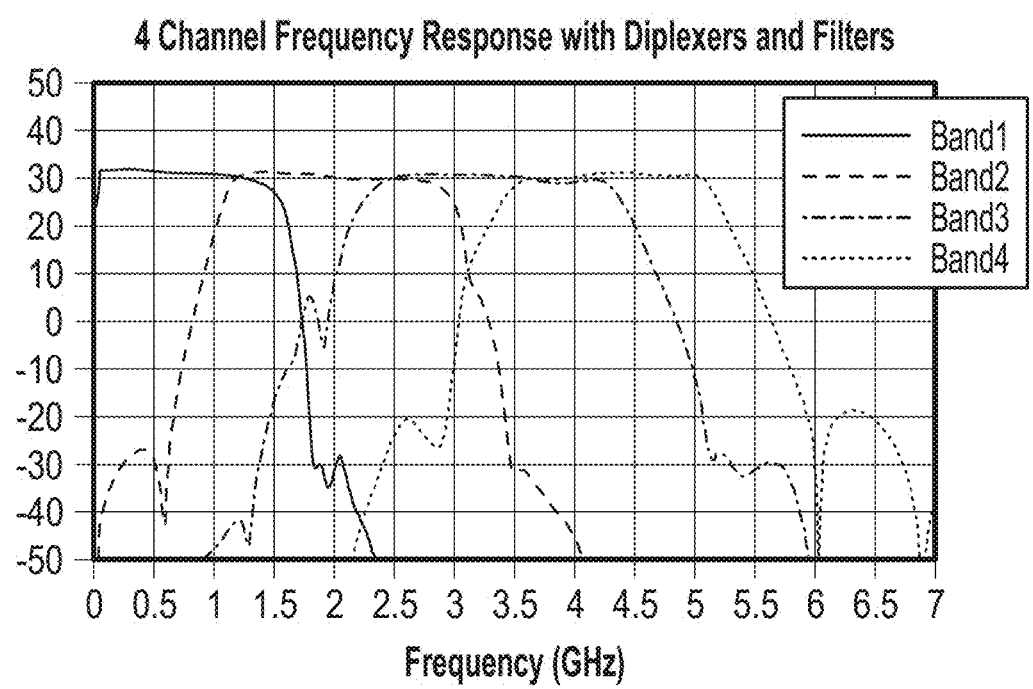
FIG. 12 is a graph of the of the frequency response of the schematic of FIG. 11.

An embodiment of the 2-diplexer implementation is depicted in FIG. 11. The frequency response of the embodiment of FIG. 11 is depicted in FIG. 12. Both diplexers depicted in FIG. 11 are 7th order and are designed using standard lumped components (including parasitics). In one embodiment, COTS filters may be implemented in this design, which may result in wide band over-laps due to the limited selection of available cut-off frequencies. However, these over-laps may be reduced with custom filters.

Upon completing the power division process, there may be sixteen band-limited channels, each of which may be routed to one of sixteen inputs on an RFSOC.

The amplifiers and the digital attenuator may have approximately 1.5 dB of gain slope each. Therefore, some gain equalization may be necessary to flatten the gain. One embodiment may utilize an equalizer, which may be a Marki Microwave MEQ series, Mini-Circuits EQY series, Knowles AEQ series, or the like.

Figures 15, 16:
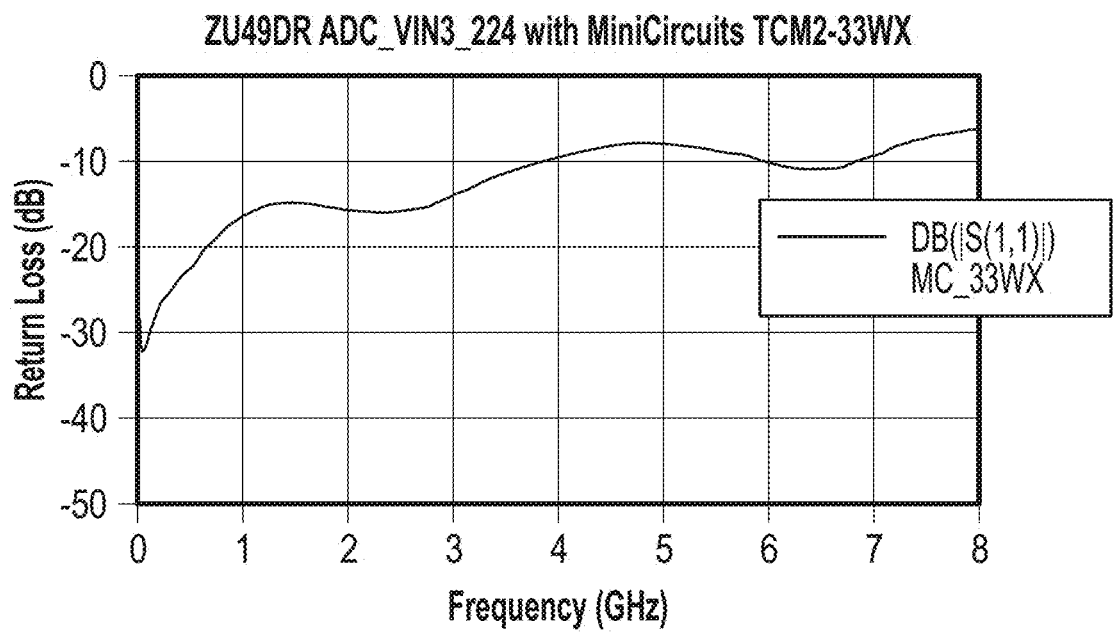
FIG. 15 is a table of specifications for a higher frequency balun according to an embodiment of the invention.
FIG. 16 is a graph depicting the return loss according to an embodiment of the present invention.

Optimum analog to digital converter 117 performance may be achieved by driving the analog input differentially. This may be accomplished with the use of baluns. For lower frequencies, Mini-Circuits TCM2-33WX+ baluns may be used, the specifications of which are shown in FIG. 13. Anaren BD1631J50100AHF or BD3150L50100AHF baluns may be used for higher frequencies, the specifications for which are shown in FIGS. 14 and 15, respectively.

In one embodiment, the analog to digital converters 117 may be sampled at 2.5 giga-samples per second, which provides a noise bandwidth of 1.25 GHz and a noise floor at the input to the analog to digital converters 117 of −83 dBm. However, the effective noise floor is −104 dBm after the spectrum is further divided by 128 to 9.765 MHz. To this effective noise floor 3 dB is added for the noise figure of the first stage amplifier (assuming this first stage amplifier sets the noise figure for the subsequent gain stages) and another 3 dB is added for implementation loss, which results in a final noise floor of −98 dBm.

In one embodiment, the analog to digital converter 117 full-scale input level may be 1 dBm and the typical SFDR may be 82 dB at the low end of the band and 76 dB at the high end of the band. Assuming the minimum dynamic range of 76 dB and the maximum input level of −1 dBm, the noise floor of the analog to digital converter 117 may range from −1 dBm to 76 dB, which equals −77 dBm of range. In an embodiment in which the noise of the sampled signal is defined by the range of noise bandwidth to the noise floor of the analog to digital converter 117, the highest system dynamic range may be achieved. The derived gain requirement is the difference between the noise levels which are −98 dBm and −77 dBm, resulting in a required RF gain of 21 dB.

A block diagram of the RF front-end circuit, according to one embodiment of the invention is shown in FIG. 11. The cascaded noise figure is 2.8 dB at the low end of the band and 2.9 dB at the high end, and the input 1 dB compression point is −15.2 dB at the low end and −12.8 at the high end.

Figure 17:
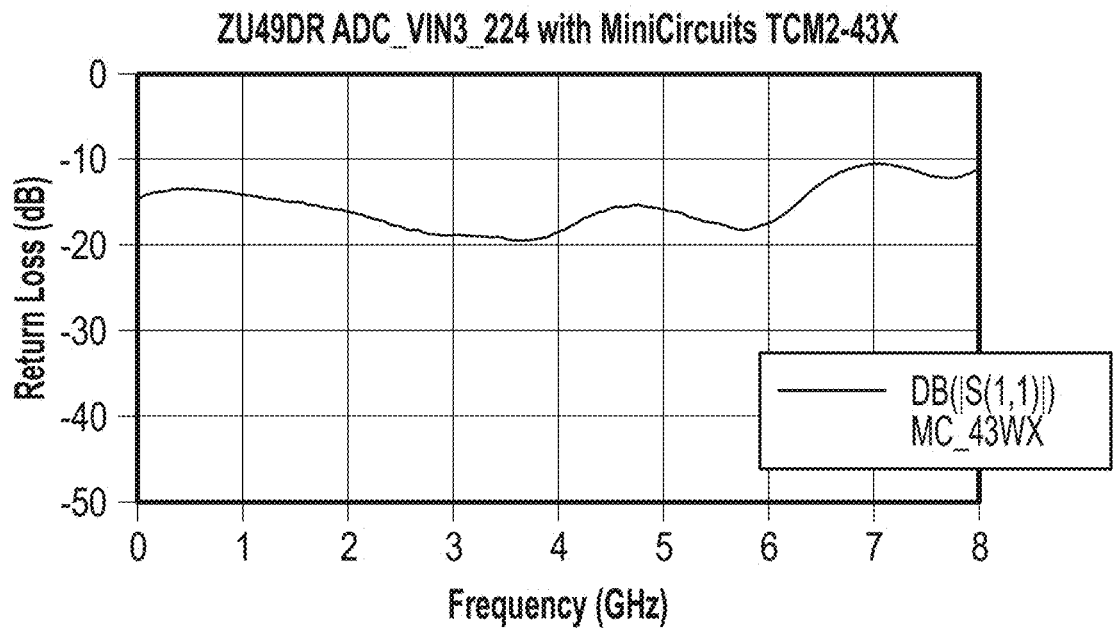
FIG. 17 is a graph depicting the return loss according to an embodiment of the present invention.

In some embodiments, the total gain of the circuit in FIG. 17 may be higher than necessary. In such an embodiment, the gain may be reduced with extra attenuation to achieve the desired level of gain. Because the SFDR varies across the band, the gain of each band may be adjusted with the attenuators (and/or different gain stages) to maximize the dynamic range of each band. To reduce power consumption at the cost of reduced 1 dB compression, the last amplifier stage may be moved to the input side of the quadplexer, reducing the number of amplifiers by 3.

Figure 18:
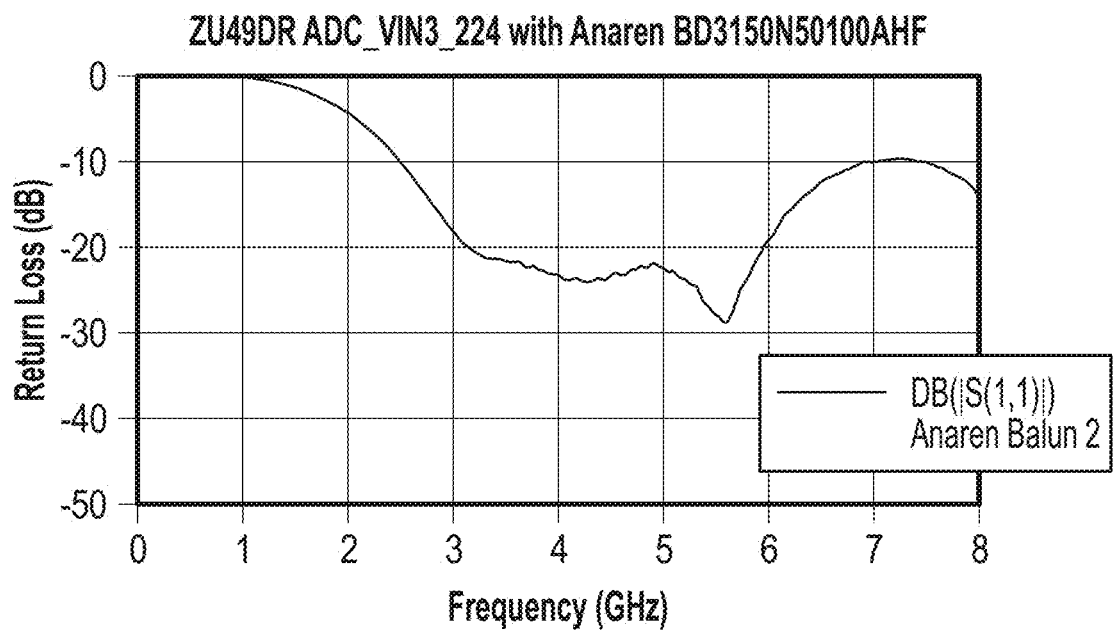
FIG. 18 is a graph depicting the return loss according to an embodiment of the present invention.

Adding a balun, which is operational over the particular band of interest, to the input to the RFSOC analog to digital converter 117 may result in a favorable return loss of 12 dB or better. Basic tuning may improve the return loss to 15 dB or better. FIGS. 16, 17, and 18 show the return loss using 3 different baluns that cover the complete band of interest as a group. The balun response depicted in FIG. 16 covers Band 1, the balun response depicted in FIG. 17 covers Bands 2 and 3, and the balun response depicted in FIG. 18 covers Band 4. Additional tuning to the circuitry may be performed based on PCB design provide optimized return loss.

In one embodiment, an RFSOC having four RF Tiles may be used. Each of the four RF tiles may have four analog to digital converters 117 that can sample at up to 2.5 GHz. However, each RF tile may have only a single oscillator driving all four analog to digital converters 117. To achieve the highest performance from this configuration, the design may take advantage of the aliasing capability of the converter implementation. The result is that all of the analog to digital converters 117 in a particular RF tile will be driven by the same sample clock, but each will digitize a different alias. To get full coverage, each RF Tile may operate at a different sample clock with the appropriate decimation rate to achieve the same final output sample clock.

Figure 19:
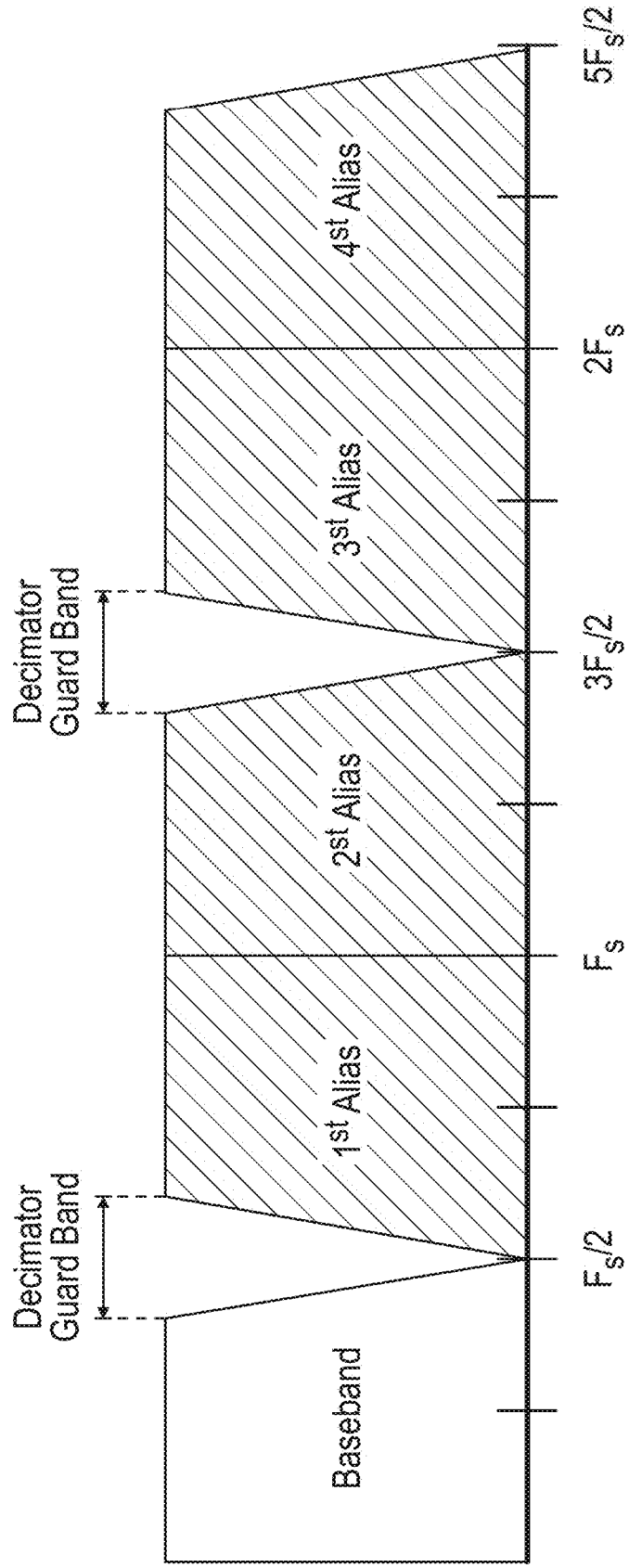
FIG. 19 is a graph depicting the available spectrum as a function of sample clock, according to an embodiment of the present invention.

As shown in FIG. 19, each of the conversion regions (baseband and aliases 1 through 4) are limited by the performance of the decimation filters, which support 80% of the Nyquist bandwidth. This limitation is evident in the conversion bandwidth specifications shown in FIG. 20.

Figures 21, 22:
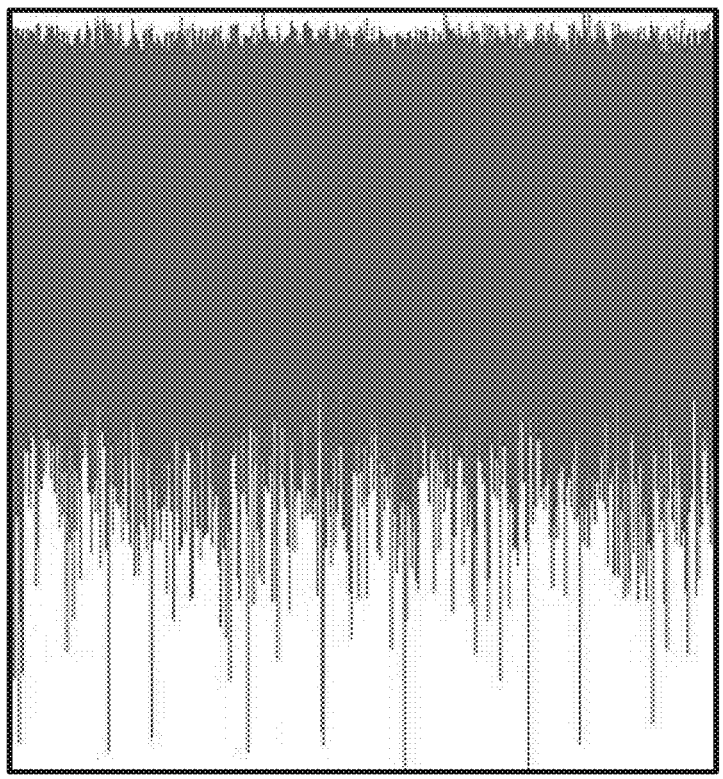
FIG. 21 is a table of expected FPGA features according to an embodiment of the present invention.
FIG. 22 depicts a time domain signal.

Subsequent to the analog to digital conversion and down-conversion using the RF tiles in the RFSOC, the spectrum may be further divided digitally using the FPGA fabric. In one embodiment, the FPGA may be implemented with Ultrascale+FPGA cells that are part of the Gen 3 RFSOC device. Such an architecture may contain 930,300 logic cells. FIG. 21 depicts the expected utilization for common functions of the FPGA. In one embodiment, the FPGA may include 425k LUTs, 4272 DSPs, and 1080 BRAMs.

Down-converting the decimated analog to digital converter 117 output into smaller channels may require approximately 10 digital signal processors (DSPs) and 1 BRAM. In embodiments in which the analog to digital converter 117 outputs are to be reduced another eight times, 128 channels are provide and approximately 1280 DSPs and 128 BRAMs are necessary. In embodiments in which there is heavy reuse between different analog to digital converter 117 channels, the BRAMs could be cut by a factor of 16. There are few architecture or design modifications that can be made to reduce the number of required DSPs in designs which implement time-multiplexes DSPs in FIR and CIC decimators. Stripping out some of the calibration tables and handling the conversion of raw measurements to calibrated values may be possible but computationally expensive elsewhere in the design, but results in conservation BRAM. Stripping other components, such as the phase and time difference measurement may also be required to fit the design within the LUT budget.

An alternative approach using FFTs may be implemented to utilize fewer FPGA resources. In one embodiment, the flow may be: signal starts→bin amplitude increases→detector fires, waits for maximum time or signal end→bin #, start time, frequency band, and some # of samples are sent to the CPU.

Performing envelope threshold-based signal detection requires 24 DSPs, 2 BRAMs, and about 1700 LUTs. In embodiments in which the early stages are run at the same rate as the 312 MHz ADC tile output, almost all of the DSPs can be shared between channels by setting up the envelope FIR filters for eight time multiplexing.

The detection process relies on an accurate derivation of thresholds extracted from the histogram of the amplitude of the data in the spectrogram. Prior to computation of the histogram, a noise reduction process 110 may be implemented to increase the contrast ratio between the potential signals of interest 108 and the background information. In one embodiment, the wavelet noise reduction process may be implemented as it has a high likelihood of success for a two-dimensional computation.

Figure 23:
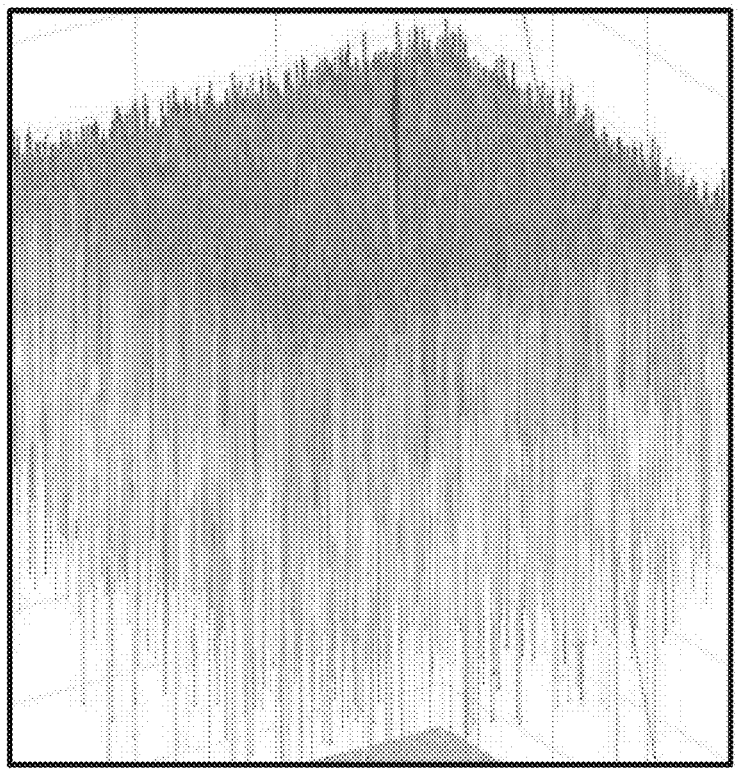
FIG. 23 depicts a spectrogram created from the time domain signal of FIG. 22.
Figure 24:
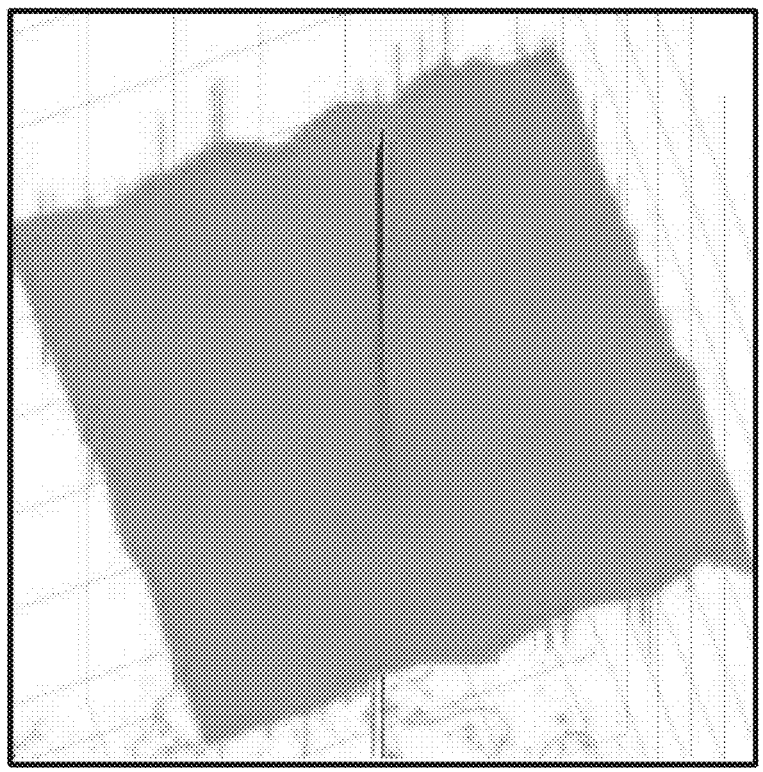
FIG. 24 depicts the spectrogram of FIG. 23 after wavelet noise reduction.

In such an embodiment, the wavelet process may be defined as follows:
Wavelet Polynomial—Biorthogonal 4.4 (BIOR 4.4)
Denoising Method—Universal Threshold
$\lambda_{univ} = \sqrt{2 \ln N} \sigma$ where N is the signal length and $\sigma^2$ is the noise variance
Threshold Rule—Soft
Noise Estimate—Level Dependent The variance of the noise based on the wavelet coefficients at each resolution level
Noise Direction—Horizontal, Vertical and Diagonal FIG. 22 depicts an original time domain signal with no apparent SOI. FIG. 23 depicts the spectrogram created from the time domain image of FIG. 22, in which can be seen a potential SOI shrouded in noise. FIG. 24 depicts the same spectrogram after wavelet noise reduction, which shows a significant improvement in contrast between the signal of interest 108 and the background.

To separate signals of interest 108 from background noise, an object detection process 115 may be applied. The object detection process 115 may include traditional computer vision algorithms applied to the time-frequency plot, which segment it into signals and noise. Three image processing algorithms may be applied to the same data set in any combination. The image processing algorithms may include histogram minima thresholding, Otsu's thresholding, and Gaussian filtering followed by Otsu's thresholding.

Results of applying each of these processing algorithms to a histogram are depicted in FIG. 25. Note that best results occur in the first row of FIG. 25, this data is when thresholds are applied to the gradient of the histogram of the image. The 2nd column, 1st row of FIG. 25 depicts the low part of the histogram, where the x axis is intensity (corresponding to log amplitude in the FFT), and the y axis is the number of pixels in a particular intensity bin. As depicted in FIG. 25, 256 bins are used because the image is stored as 8-bit unsigned integers. The red dots in column 2 show the thresholds that were applied.

Figure 26:
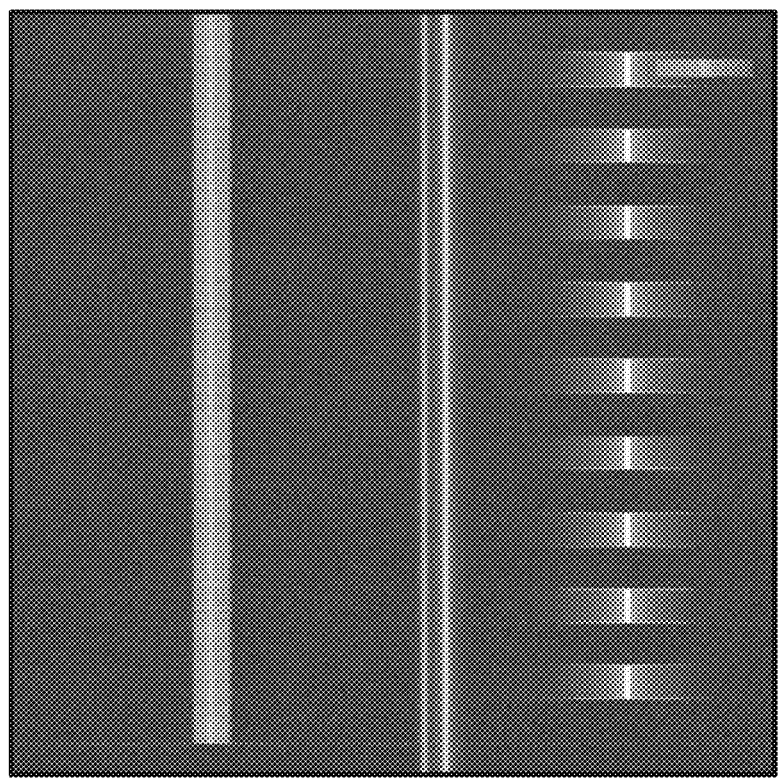
FIG. 26 depicts an identified signal of interest according to an embodiment of the present invention.

Using the second lowest returned threshold (the lowest is the bottom of the noise peak) to make a binary image, then fitting bounding boxes around contours, we get the result depicted in FIG. 26. Note that this process results in the identification of most signals, except for the faintest ones.

Figure 27:
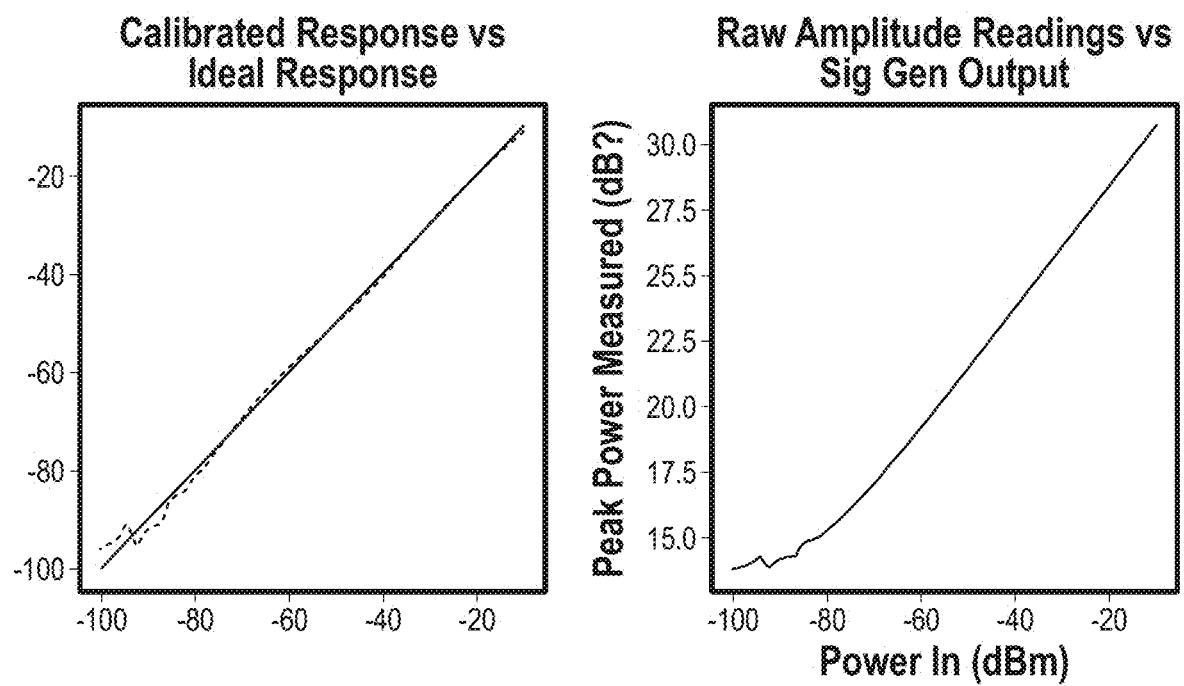
FIG. 27 is a graph of the results of amplitude calibration according to an embodiment of the present invention.

Amplitude cannot be measured directly from the image output because the image is log scale and adjusted so the amplitude maps to the range required by the image processing algorithms. A separate unscaled spectrogram is kept, and amplitude may be determined by adding up the frequency bins in the sample bandwidth of the unscaled spectrogram and then finding the maximum amplitude. Calibration may be performed with a 4th order polynomial. The results of amplitude calibration are depicted in FIG. 27.

Object classification methods applied to imagery may rely on trained FCN networks to statistically predict the likely characteristics of the image. Time-frequency data sets (Spectrograms) are essentially greyscale images, so image processing methods may be repurposed to classify signals.

The NVIDIA DetectNet object detector is designed and may be used to process color images with separate layers for each color. The time-frequency data provided to the object detector is a single-layer dataset equivalent to a grayscale image, which does not directly map to the three-layer detector. Therefore, the time-frequency data may be up-sampled to three layers and provided to the object detector. A slice and a silence layer may be applied to the resulting output layers of the object detector transformation to discard two of the channels, leaving a single-channel grayscale image.

Figure 28:
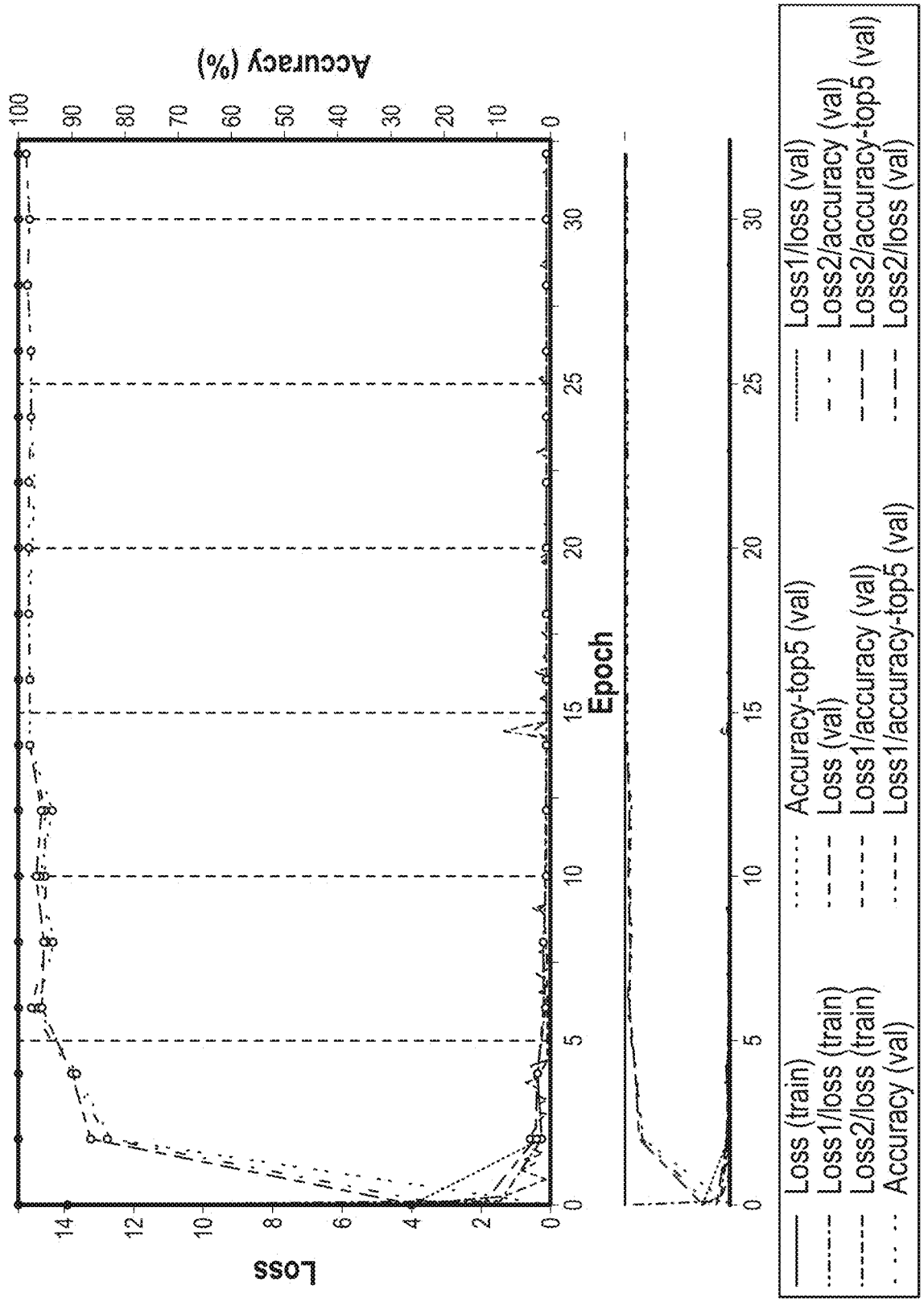
FIG. 28 is a graph of the results of image classification training according to an embodiment of the present invention.

The object detector may use the GoogLeNet image classification network with its fully connected layers removed and the convolutional output connected to a bounding box clustering algorithm for training as results prior to training may be unreliable. In one embodiment, training may start from a core GoogLeNet algorithm. GoogLeNet only classifies images and does not provide bounding boxes for objects it finds. When the network is modified to accommodate the spectrogram it may produce a stable result with 97-98% classification accuracy on the validation set in just 14 epochs with 9500 training and 1000 validation images. The results are depicted in FIG. 28.

Figure 29:
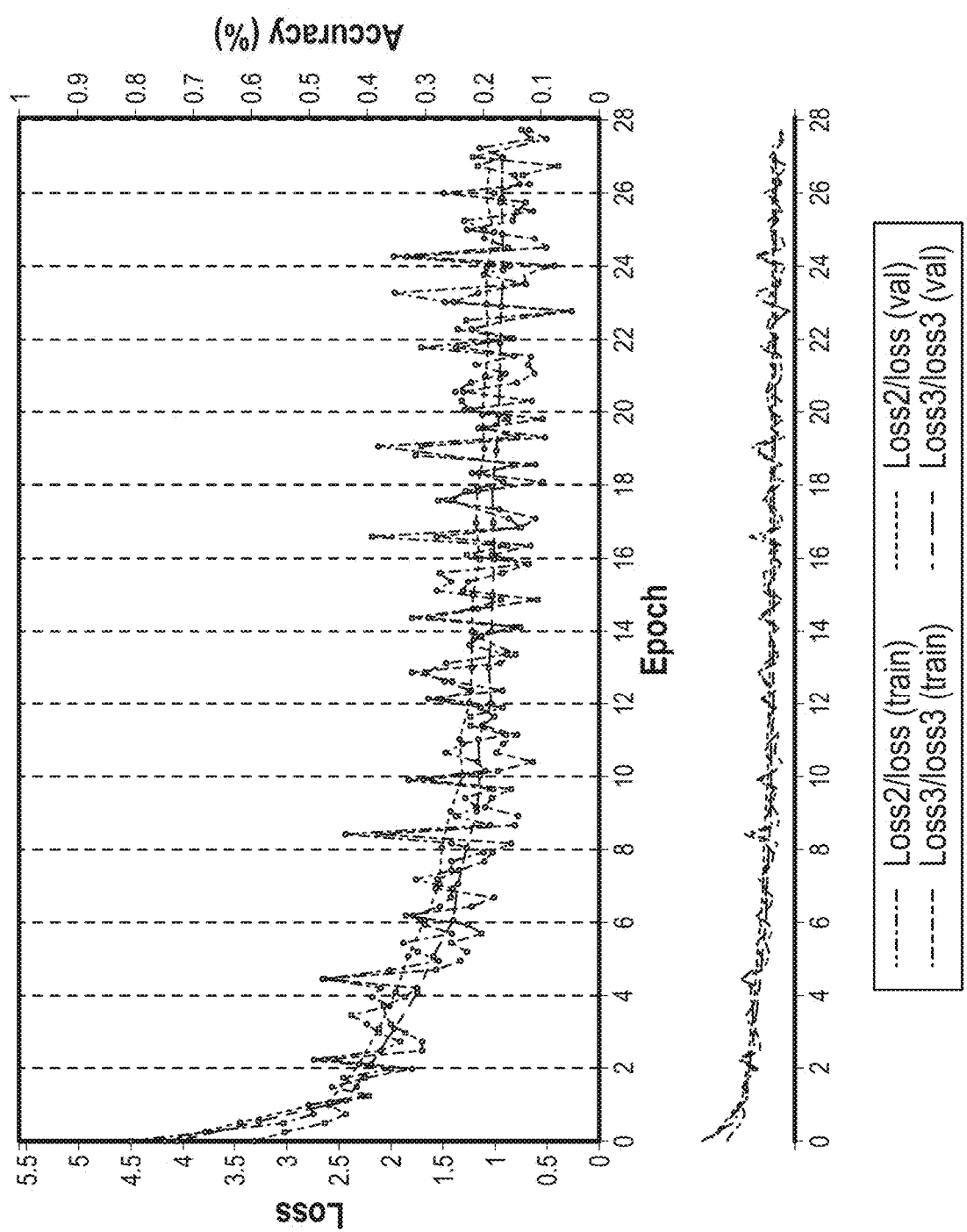
FIG. 29 is a graph of object detector training results according to an embodiment of the present invention.

The object detector may be improved if GoogLeNet can classify images having multiple signals. In one embodiment, instead of using an output layer which assumes the image classes are mutually exclusive (softmax), an output layer that assumes each class is a different but related problem (Sigmoid) may be used. DIGITS from a container image doesn't support this sort of classification or even this sort of dataset. A data plugin for DIGITS may be created. The data plugin may scan folders for training and validation data. The data plugin may then map the chosen classes to output neurons in the order provided to DIGITS. The data plugin may also map unknown classes to the first neuron, using it as a default. In one embodiment, extra data augmentation features, primarily the ability to randomly upscale and crop the training images may improve training results. The network configuration may be set to take the 640×640 images and scale them with a uniform random distribution from 640×640 to 720×720, then crop a 640×640 image out of the result. Training progress using this method is depicted in the graph of FIG. 29.

The process of labelling individual pixels or regions with what object is present there may be referred to as semantic segmentation. The end goal of semantic segmentation may be similar to the end goal of the object detection network, but the output of semantic segmentation is an image rather than a list of objects. Fully convolutional networks may be employed to perform semantic segmentation. What makes a network fully convolutional is that instead of having one or more layers of densely connected neurons after the convolution layers, an additional convolution layer performs the classification. This allows the network to classify regions of an image rather than the image as a whole.

Semantic segmentation training may be performed using a usual MATLAB training data script modified to output palleted single channel PNG labels, essentially an image version of the DetectNet output. To improve the size of the outputs, the results may be scaled up and a subsequent process may assign each pixel a class. To increase resolution, the system may predict pixels using the higher resolution of the earlier layers and combine this with predictions from upscaled output of the later layers. GoogleNet may be modified into an FCN by replacing the final layers with an appropriate set of convolutions.

The classification process 128 is the process by which a set of samples believed to be a signal of interest 108 are converted into a data set that describes the information in the form of its signal characteristics. The classification process may operate on the time/frequency domain extracted data set and use the FCN network to identify the signal thorough it's two-dimensional image properties. In effect, the classification process 128 leverages image identification technology to determine the likely characteristics of the signal of interest 108.

The FCN network may identify signals of interest 108 by comparing the output of the convolution process to representations of signals either generated from simulation or captured from other emitters by virtue of the deep learning training where the processing paths, computational structures, and scalar coefficients are instantiated. Neural Network processing may provide an initial identification, dividing the signals of interest into RADAR and Communications signals such that they can be more effectively processed in the time domain.

Data extracted by the detection process and identified by the neural network as a potential signal of interest 108 may be converted back to the time-domain using inverse frequency transformation processes.

Communications signals that carry data are typically coded and modulated to improve transmission probability in the presence of fading, multipath and noise. The classification process 128 will discern these coding and modulation characteristics from the time domain data. By way of example, and not as a limitation, characteristics of interest may include the following:

Center Frequency—The selected transmission frequency.
Bandwidth—the spectrum occupied by 90% of the power spectral density.
Modulation Type—That parameter translated by the applied data.
Burst Length—The time from the beginning to the end of the transmission.

RADAR signals are typically pulses with specific characteristics designed to enhance the resolution of the return from objects of interest. The classification process 128 may discern these characteristics from the time-domain data. By way of example, and not as a limitation, characteristics of interest may include the following:

RF Characteristics—including Center Frequency, bandwidth, and doppler shift
Pulse Repetition Characteristics and pattern if changing—Time between leading edges of pulses.
Pulse Width—Time or pulse duration of the transmitted signal.
Scan Period—describes the antenna scan characteristics.
Type—Pulse, Pulse Doppler, Pulse Compression, Synthetic Aperture, Inverse Synthetic Aperture, Imaging, Tracking, Three-dimensional, frequency modulated continuous wave, precipitation, cloud profiling
Beamwidth—Width between the half power points.
Illumination time
Clock characteristics By way of example, and not as a limitation, analysis performed by the classification process 128 for classification may include:

Burst Analysis—This method may evaluate the time-domain samples to identify the burst shape. The shape may differentiate the signal as to the source: radar, communications, emissions, noise, etc.
Detection—This method searches the time-domain samples looking for a preambles or mid-ambles that may be used by a receiver to calculate the frequency error and determine the beginning of the transmission burst.
Equalization—This method may search the time domain samples looking for a known reference that may be used to determine the characteristics that the signal saw as it passed through the time-space channel.
Demodulation—This method may attempt to identify the modulation method.

By way of example, and not as a limitation, a system as described herein may be configured to include the following hardware:

RF Interface Electronics—This may be a circuit card containing the broadband gain stages, the sixteen channel filters, and the impedance/gain matching networks to interface with the RFSoC.

RFSoC Card—This may be a circuit card containing the ZU49DR, or other RFSoC, device, the local power converters and the backplane interface electronics.

Graphics Processor (GPU) Card— This may be a circuit card with an NVIDIA or other compliant GPU, supporting power converters and a backplane interface. There may be multiple GPU cards as required to meet the performance requirements General Purpose Processing—This may be a processor card that is running the Linux operating system and the ESM/SIGINT application software.

Power Conversion—This may be electronics contained on its own circuit card or incorporated on other circuit cards that takes the power input and converts it to backplane voltages.

Chassis—This may be a physical housing providing card slots and backplane for each of the above-described cards.

This system may include and combine application software that is resident on an FPGA, GPU and general-purpose processor.

The design and implementation of a Digital HPOI Receiver as described herein significantly improves on previously implemented analog implementations. The system may be integrated with a set of antennas, a tunable narrowband receiver, and existing application software designed to classify the potential source of an emission and a possible location or bearing.

The inventive system may implement a method for noise reduction, which allows for the extraction of a signal of interest from a sampled spectrum. This method may be a double transform noise reduction. FIG. 22 depicts a sampled spectrum.

Consider a time-domain data set that is captured from a sensor system that contains signals of interest embedded in the data that are bounded in both time and frequency in a data set that includes noise and other signals not of interest. The inventive method can enhance the separation between the potential signals of interest and the background, which may be considered noise. The inventive method spreads the noise over the time-frequency space while retaining the boundary conditions of the signals of interest. The process effectively improves the signal to noise ratio in the time/frequency region of interest.

The inventive method includes a double transform on the original data set of dimension 'n' expanding the dimensional space by 2, which yields a data set of dimensions 'n+2'. The new dimensional space is more readily processed to discern the signal of interest using conventional threshold calculations, which may be performed by the inventive method.

The process of sampling an energy source using a sensor or energy conversion device produces a data set of n dimensions consisting of energy intensity values repeated at the time interval rate defined by the sampling system. The sampled data set contains information of interest defined as bounded in both time and frequency that is potentially obscured by various forms of uncorrelated information. By its nature, the uncorrelated information is distributed in frequency and time whereas the signal of interest is known to be bounded in both frequency and time. This difference in the nature of the uncorrelated information versus the signal of interest is exploited by the inventive method.

For a given array sampled at an interval in time, an initial transform, or primary transformation, is applied to the data set using a basis function defined wholly in the frequency domain. The function converts a series of time samples to a series of frequency samples. Subsequent time samples are converted to form another series of frequency samples. The transformed data set is now represented by both time and frequency and implemented as orthogonal axes in the output array. FIG. 23 depicts the result of the sampled spectrum in 22 after the primary transform. Note the potential signal of interest depicted in the center of the array of FIG. 23.

For a single dimension time series, the resulting transform creates a two-dimensional space typically described as a "waterfall".

The secondary transform, or secondary transformation, uses a basis function specified in both the time and frequency domain and is applied to the two-dimensional data set shown in FIG. 23. The basis function is selected to differentiate the amplitude such that there is additional separation between the signal of interest and the remaining samples in the data set. The result of the secondary transform adds another dimension to the space, which is orthogonal to both the time and frequency axes.

The initial transform results in the distribution of noise over the time frequency space yielding the desired improvement in signal to noise ratio based on the difference between the bounded signal of interest and the unbounded noise. The secondary transform generates a localized minima surrounding the samples representing the signals of interest. A threshold is computed by binning the samples by amplitude such that the minima exposed by the secondary transform is exposed and now bounds the samples representing the signal of interest. The signal can now be identified in the data set and extracted for further analysis. FIG. 24 depicts the result of this process. Note that the location of the potential signal of interest is clearly delineated in the data set.

The inventive method may be implemented by initializing the data set, performing a primary transform, performing a secondary transform, computing a threshold, bounding the data, and extracting the data.

The data set may be initialized by transforming the initial data set to a resolution that is consistent with the expectations of processing performance. In one embodiment, the data may be represented as a sixteen-bit signed integer and scaled to occupy the full range of the defined format to take advantage of the expected processing structures (the signal processing cores available in typical Field Programmable Gate Array or Arithmetic Logic Unit). To take advantage of fast transform algorithms, the data space may be extended or interpolated to a power of two along the dimensional axes. The process will address discontinuities using interpolation or windowing functions.

The primary transform may be performed by applying the Fast Fourier Transform (FFT) to the normalized data space to minimize the calculation requirements (versus a conventional transform) and support a higher sample rate. The transform length may be chosen to provide at least an order of magnitude difference between the number of frequency bins occupied by the signals of interest and the total number of frequencies generated by the transform. A larger transform will yield additional resolution of the signals of interest and better noise distribution but at a higher calculation cost.

The secondary transform may be performed by applying the two-dimension Wavelet Transform to the time-frequency data set to achieve further separation of the noise from the potential signals of interest. To separate signals of interest from background noise, we may apply traditional computer vision algorithms to the time-frequency plot to segment it into signals and noise.

Three typical image processing algorithms may be applied to the same data set:

Histogram Minima Thresholding

Otsu's Thresholding

Gaussian Filtering followed by Otsu's Thresholding

Results of applying these algorithms to the data set of FIG. 24 are depicted in FIGS. 25A and 25B. Note that the best results occurred in the first row of each figure when thresholds were applied to the gradient of the histogram of the image. The second column, first row of FIG. 25A depicts the low part of the histogram, where the x axis is intensity (corresponding to log amplitude in the FFT), and the y axis is the number of pixels in a particular intensity bin. 256 bins are used since the image is stored as 8-bit unsigned integers. The dots in column 2 of FIG. 25A depict the thresholds being used.

The method may utilize the second lowest returned threshold (the lowest is the bottom of the noise peak) as a threshold to make a binary image. Then, bounding boxes may be fitted around contours to provide the result depicted in FIG. 26. Note that most signals are identified except the faintest ones.

Amplitude may not be measured directly from the image output since the image is log scale and adjusted so the amplitude maps to the range required by the processing algorithms. A separate unscaled spectrogram may kept, and amplitude may be determined by adding up the frequency bins in the sample bandwidth to find the maximum amplitude. Calibration may be performed by providing a 4th order polynomial to the system.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A system for signal detection comprising:
   a receiver adapted to provide an initial dataset sampled in a time domain over a frequency range;
   a transforming block adapted to receive the initial dataset and convert the initial dataset from the time domain to a multi-channel time-frequency domain array;
   a noise reduction block adapted to receive the multi-channel time-frequency domain array and provide a clean data set, wherein the clean data set is defined as a noise signal subtracted from the multi-channel time-frequency domain array; and
   an object detection block adapted to receive the clean dataset and to provide a bounded data set, wherein the bounded data set is defined by a bounding box associated with a portion of the multi-channel time-frequency domain array containing a signal with energy above a threshold level.

2. The system of claim 1 further comprising:
   an identification process adapted to receive the bounded data set from the object detection block, to receive the multi-channel time-frequency domain array, and to extract a signal of interest from the multi-channel time-frequency domain array wherein the signal of interest is carried by the portion of the multi-channel time-frequency domain array within the bounding box.

3. The system of claim 1 wherein the noise reduction block comprises a transfer function block adapted to execute a transfer function on the multi-channel time frequency domain array.

4. The system of claim 3 wherein the transfer function is a double transform.

5. The system of claim 1 wherein the frequency range comprises a plurality of reduced bandwidth ranges; and
   the transforming block comprises a plurality of transforming components wherein each of the plurality of transforming components is adapted to receive one of a plurality of reduced bandwidth datasets, wherein each of the plurality of reduced bandwidth datasets includes a portion of the single channel initial dataset corresponding to one of the plurality of reduced bandwidth ranges, wherein each of the plurality of transforming components is further adapted to convert its corresponding reduced bandwidth dataset from the time domain to a time-frequency domain and provide a corresponding channel of the multi-channel time-frequency domain array.

6. The system of claim 5 wherein the multi-channel time-frequency domain array comprises an aggregation of each of the channels provided by the plurality of transforming components.

7. The system of claim 5 wherein each of the channels of the multi-channel time-frequency domain array provided by each of the plurality of transforming components is time-aligned to each of the other channels of the multi-channel time-frequency domain array provided by each of the other plurality of transforming components.

8. The system of claim 5 wherein the transforming block further comprise:
   a plurality of bandpass filters, each adapted to receive the initial dataset and provide one channel with a frequency range corresponding to a frequency range of one channel of the multi-channel time-frequency domain array.

9. The system of claim 5 wherein each of the plurality of transforming components comprises:
   an analog to digital converter adapted to receive one channel with a frequency range corresponding to a frequency range of one channel of the multi-channel time-frequency domain array and provide a digitized dataset; and a down converter adapted to receive the digitized dataset and provide a plurality of complex digital channels, wherein each of the plurality of complex digital channels comprises an in-phase portion and a quadrature-phase portion.

10. The system of claim 9 wherein each of the plurality of transforming components further comprises a frequency transformer adapted to receive one of either the in-phase portion or the quadrature-phase portion of each of the down converters and provide a channel in the time-frequency domain.

11. The system of claim 1 wherein the transforming block comprises a processor adapted to receive the multi-channel time-frequency domain array and apply an initial transform to each channel of the multi-channel time-frequency domain array at the same point over a specified length.

12. The system of claim 11 wherein each channel of the multi-channel time-frequency domain array is padded with at least one zero value prior to applying the initial transform.

13. The system of claim 11 wherein the initial transform is a Fourier transform.

14. The system of claim 1 wherein the object detection block is configured to divide the clean dataset into a plurality of histogram bins with each histogram bin having an energy level and the bounding box is defined to include all portions of the dataset included in a histogram bin having an energy level above the threshold level.

* * * * *